United States Patent
Chien

(10) Patent No.: US 11,085,601 B2
(45) Date of Patent: Aug. 10, 2021

(54) MICROWAVE-SENSOR APPLICATION FOR LIGHT OR ELECTRIC DEVICE

(71) Applicant: Tseng-Lu Chien, Walnut, CA (US)

(72) Inventor: Tseng-Lu Chien, Walnut, CA (US)

( * ) Notice: Subject to any disclaimer, the term of this patent is extended or adjusted under 35 U.S.C. 154(b) by 129 days.

(21) Appl. No.: 16/032,664

(22) Filed: Jul. 11, 2018

(65) Prior Publication Data

US 2019/0113191 A1    Apr. 18, 2019

Related U.S. Application Data

(60) Continuation-in-part of application No. 14/967,862, filed on Dec. 14, 2015, which is a
(Continued)

(51) Int. Cl.
*F21V 23/00* (2015.01)
*F21S 8/00* (2006.01)
(Continued)

(52) U.S. Cl.
CPC .............. *F21S 8/035* (2013.01); *F21L 4/00* (2013.01); *F21S 4/10* (2016.01); *F21S 4/28* (2016.01); *F21S 10/002* (2013.01); *F21V 5/04* (2013.01); *F21V 13/02* (2013.01); *F21V 14/003* (2013.01); *F21V 14/006* (2013.01); *F21V 14/06* (2013.01); *F21V 14/08* (2013.01); *F21V 17/02* (2013.01); *F21V 21/08* (2013.01); *F21V 21/14* (2013.01); *F21V 21/22* (2013.01); *F21V 23/00* (2013.01); *F21V 23/04* (2013.01); *F21V 23/0471* (2013.01); *F21V 29/00* (2013.01); *G02F 1/1313* (2013.01); *G03B 21/2046* (2013.01); *G03B 23/00* (2013.01); *F21K 9/232* (2016.08); *F21S 8/033* (2013.01); *F21S 9/02* (2013.01); *F21S 9/035* (2013.01); *F21S 10/007* (2013.01); *F21V 17/002* (2013.01); *F21V 21/0824* (2013.01);
(Continued)

(58) Field of Classification Search
CPC ........ F21S 4/10; F21S 9/02; F21S 4/28; F21S 10/02; F21S 10/007; G02F 1/1313; F21V 21/22; F21V 5/04; F21V 21/08; F21V 21/14; F21V 21/30; F21V 23/0442; F21V 23/0471; F21V 23/0435; F21V 21/29; F21V 17/02; F21V 14/006; F21V 23/00; F21V 13/02; F21V 14/08; F21K 9/232; F21Y 2115/30; F21Y 2101/00; F21Y 2115/10; F21W 2131/109; F21W 2121/00; G03B 21/2046; G03B 23/00; Y10S 362/806

See application file for complete search history.

(56) References Cited

U.S. PATENT DOCUMENTS

| | | | |
|---|---|---|---|
| 7,985,004 B1 * | 7/2011 | Schach | F21S 8/083 362/276 |
| 2008/0224849 A1 * | 9/2008 | Sirhan | F21V 23/0442 340/521 |

(Continued)

*Primary Examiner* — Y M. Quach Lee
(74) *Attorney, Agent, or Firm* — Bacon & Thomas, PLLC

(57) ABSTRACT

A microwave-sensor application for a light or electric device has a built-in microwave-sensor which can penetrate a wall, glass, building, garage door, or cement to detect over a 360 degree angle and predetermined vertical range. The microwave sensor can be used to activate a microwave-sensor application device or light device having an LED and/or laser for illumination or to provide an anti-theft alarm or warning.

28 Claims, 17 Drawing Sheets

Figure 1:
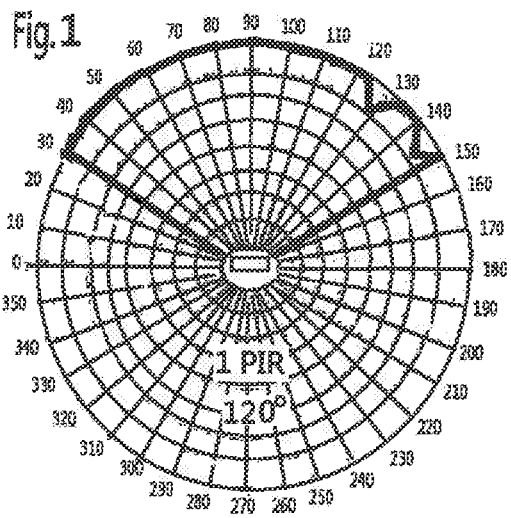

Related U.S. Application Data continuation-in-part of application No. 14/539,267, filed on Nov. 12, 2014, which is a continuation-in-part of application No. 14/275,184, filed on May 12, 2014, now Pat. No. 10,371,330, which is a continuation of application No. 12/914,584, filed on Oct. 28, 2010, now Pat. No. 8,721,160, which is a division of application No. 12/318,470, filed on Dec. 30, 2008, now abandoned, application No. 16/032,664, filed on Jul. 11, 2018, which is a continuation-in-part of application No. 15/296,599, filed on Oct. 18, 2016, now Pat. No. 10,228,112, which is a continuation of application No. 14/503,647, filed on Oct. 1, 2014, now Pat. No. 9,719,654, which is a division of application No. 14/451,822, filed on Aug. 5, 2014, now Pat. No. 10,047,922, which is a continuation-in-part of application No. 14/323,318, filed on Jul. 3, 2014, now Pat. No. 10,222,015, which is a continuation-in-part of application No. 14/023,889, filed on Sep. 11, 2013, now Pat. No. 10,323,811, application No. 16/032,664, filed on Jul. 11, 2018, which is a continuation-in-part of application No. 15/816,260, filed on Nov. 17, 2017, which is a continuation-in-part of application No. 15/730,350, filed on Oct. 11, 2017, which is a continuation-in-part of application No. 14/967,862, filed on Dec. 14, 2015, and a continuation-in-part of application No. 15/494,477, filed on Apr. 22, 2017, now abandoned, which is a continuation-in-part of application No. 15/355,515, filed on Nov. 18, 2016, which is a continuation-in-part of application No. 14/289,968, filed on May 29, 2014, now Pat. No. 9,551,477, which is a continuation-in-part of application No. 14/280,865, filed on May 19, 2014, now Pat. No. 9,581,299, which is a continuation-in-part of application No. 13/540,728, filed on Jul. 3, 2012, now Pat. No. 8,834,009, which is a continuation-in-part of application No. 13/296,469, filed on Nov. 15, 2011, now Pat. No. 8,711,216, application No. 16/032,664, filed on Jul. 11, 2018, which is a continuation-in-part of application No. 15/730,291, filed on Oct. 11, 2017, now Pat. No. 10,495,274, which is a continuation-in-part of application No. 14/967,862, filed on Dec. 14, 2015.

(51) Int. Cl.

| | | |
|---|---|---|
| *F21V 5/04* | (2006.01) | |
| *F21S 10/00* | (2006.01) | |
| *F21V 29/00* | (2015.01) | |
| *F21S 4/28* | (2016.01) | |
| *F21V 21/22* | (2006.01) | |
| *F21V 21/14* | (2006.01) | |
| *F21V 21/08* | (2006.01) | |
| *F21V 14/08* | (2006.01) | |
| *F21V 13/02* | (2006.01) | |
| *F21V 14/06* | (2006.01) | |
| *F21V 23/04* | (2006.01) | |
| *G02F 1/13* | (2006.01) | |
| *F21V 17/02* | (2006.01) | |
| *G03B 23/00* | (2006.01) | |
| *F21V 14/00* | (2018.01) | |
| *G03B 21/20* | (2006.01) | |
| *F21L 4/00* | (2006.01) | |
| *F21S 4/10* | (2016.01) | |
| *F21K 9/232* | (2016.01) | |
| *F21S 9/02* | (2006.01) | |
| *G03B 21/14* | (2006.01) | |
| *F21W 121/00* | (2006.01) | |
| *F21Y 101/00* | (2016.01) | |
| *F21Y 115/10* | (2016.01) | |
| *F21V 21/29* | (2006.01) | |
| *F21V 21/30* | (2006.01) | |
| *F21V 33/00* | (2006.01) | |
| *F21S 9/03* | (2006.01) | |
| *F21W 131/10* | (2006.01) | |
| *F21W 131/109* | (2006.01) | |
| *F21V 17/00* | (2006.01) | |

(52) U.S. Cl.
CPC ............... *F21V 21/29* (2013.01); *F21V 21/30* (2013.01); *F21V 23/045* (2013.01); *F21V 23/0442* (2013.01); *F21V 33/0052* (2013.01); *F21W 2121/00* (2013.01); *F21W 2131/10* (2013.01); *F21W 2131/109* (2013.01); *F21Y 2101/00* (2013.01); *F21Y 2115/10* (2016.08); *G03B 21/142* (2013.01); *Y10S 362/80* (2013.01); *Y10S 362/806* (2013.01)

(56) References Cited

U.S. PATENT DOCUMENTS

2012/0306384 A1* 12/2012 Chen ..................... F21S 9/037
  315/159
2012/0325982 A1* 12/2012 Guercio ............... F21V 31/005
  362/296

* cited by examiner

Microwave Sensor

Orientation View

Down/Up View

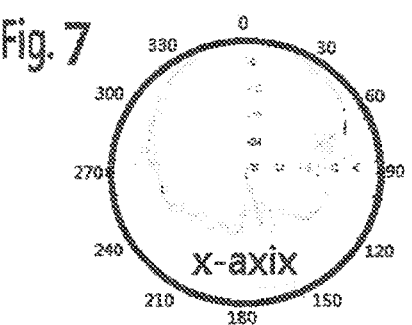
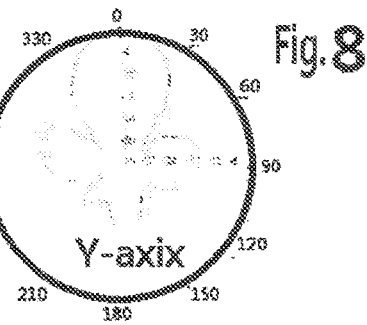
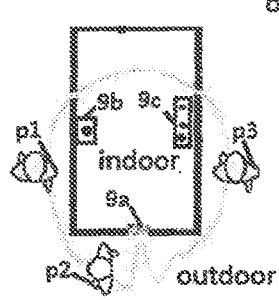
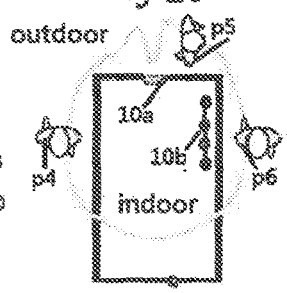
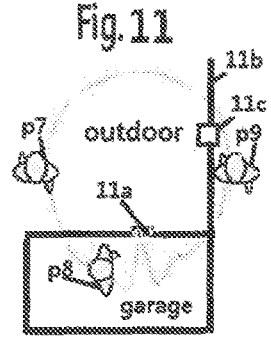
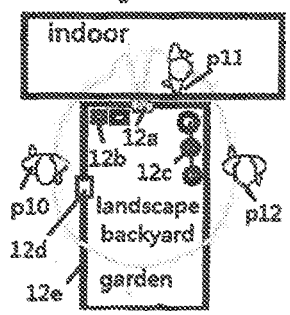
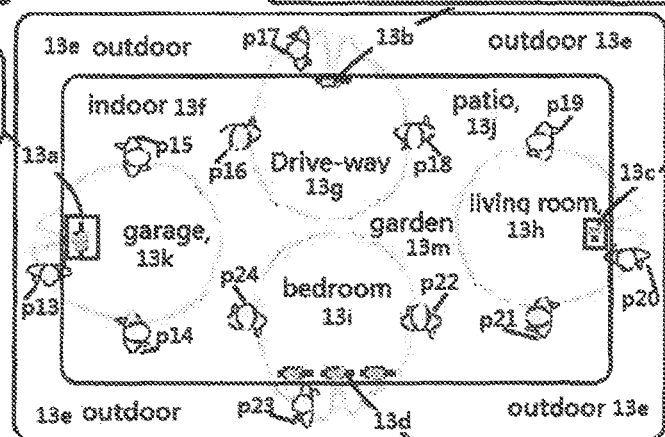

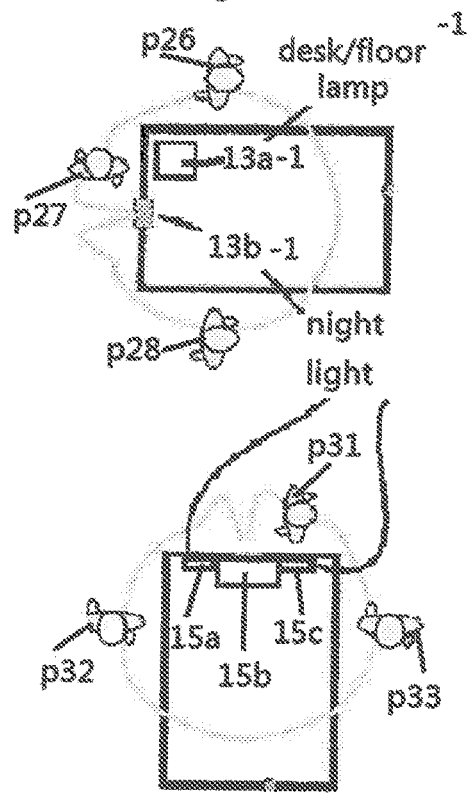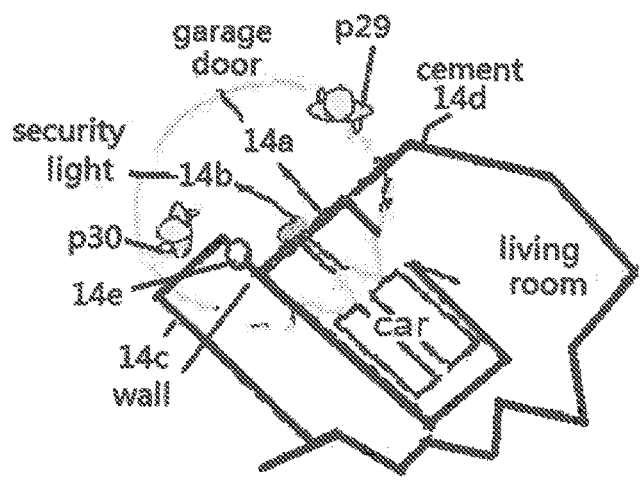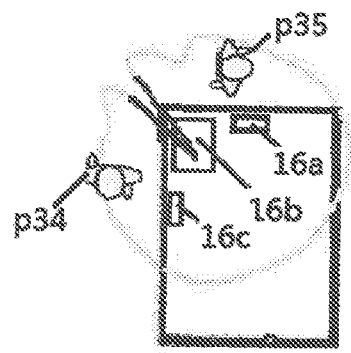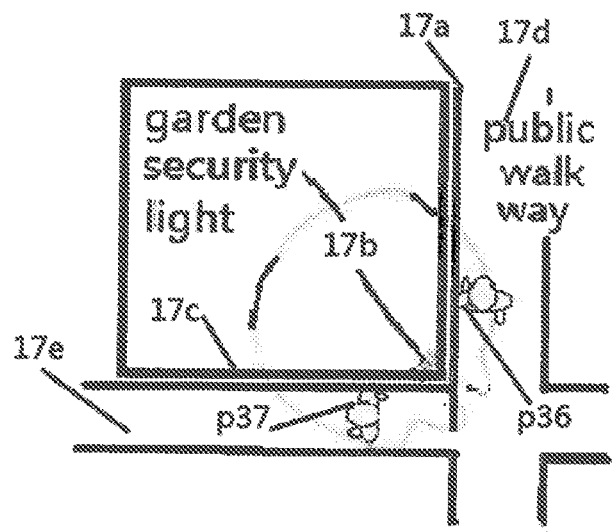

Transfer Circuit for Frequency/Voltage

Module for Microwave Sensor diagram

● Module terminals connection diagram

| LEGS | FUNCTIONS |
|---|---|
| 1 | (+) Positive of Power Source |
| 2 | Signal export-end |
| 3 | (-) Negative of Power Source |
| CDS | Connect Photo Sensor(CDS) |
| A | 16 level sensitivity adjust sw. |
| B | 4 models for trigger type |

Fig. 20

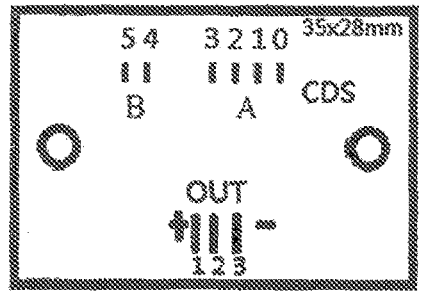

Fig. 21

Example of Diagram for Application

A. LOAD CIRCUIT FOR DIRECT CURRENT (D.C.)

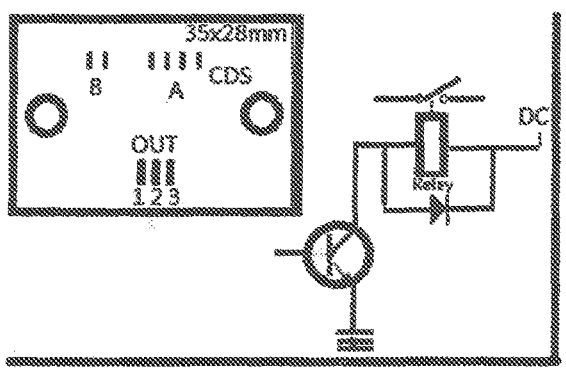

Fig. 22

B. LOAD CIRCUIT FOR ALTERNATIVE CURRENT (A.C.)

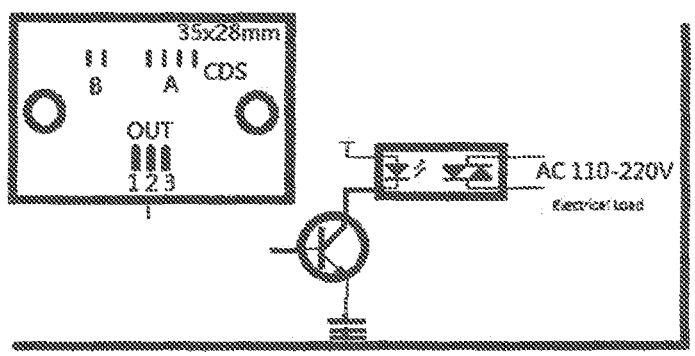

Fig. 23

Fig. 24 Module for Microwave sensor
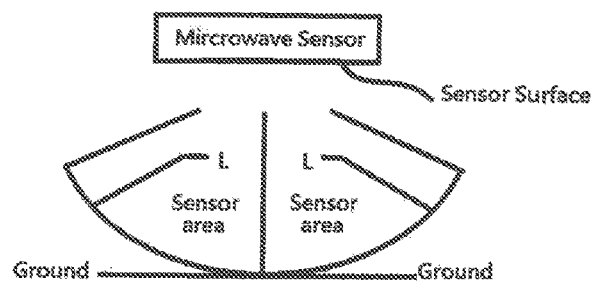
One Market available of Module for Microwave sensor
Fig. 25 Circuitry Diagram
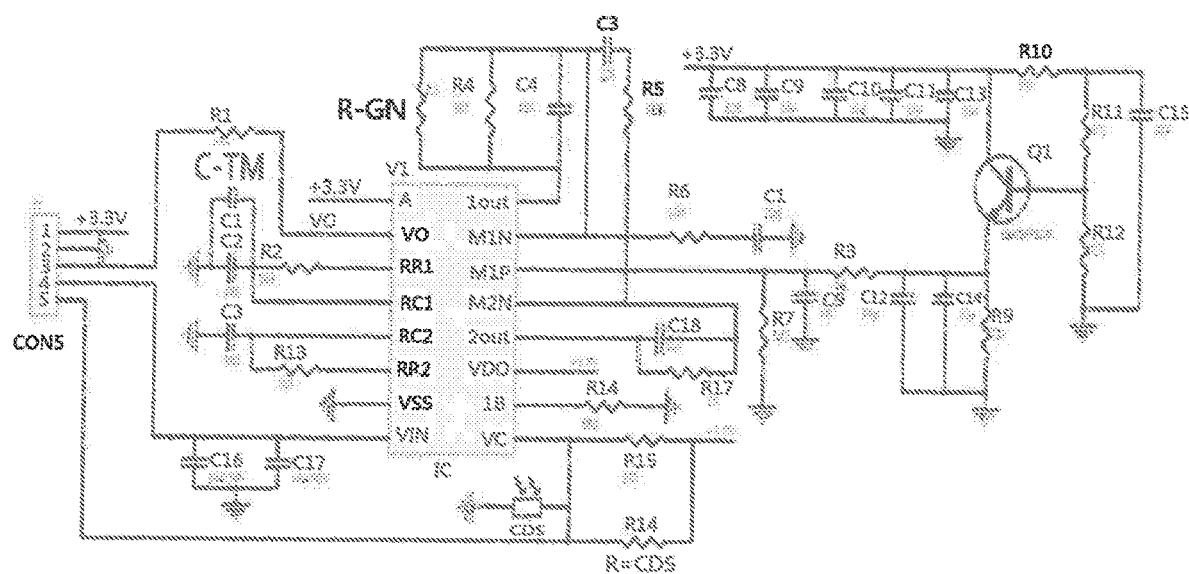

Figure 2:
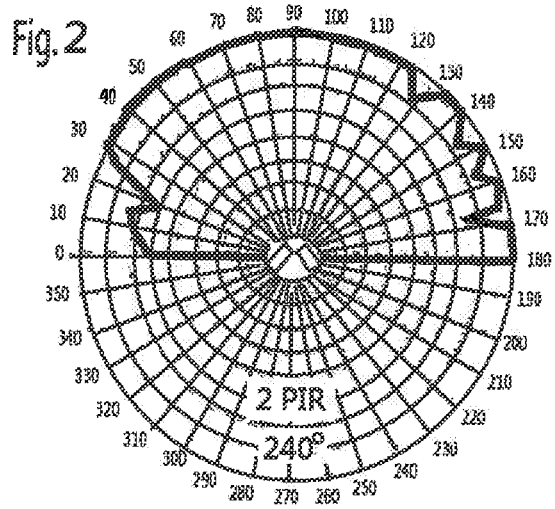
Figure 3:
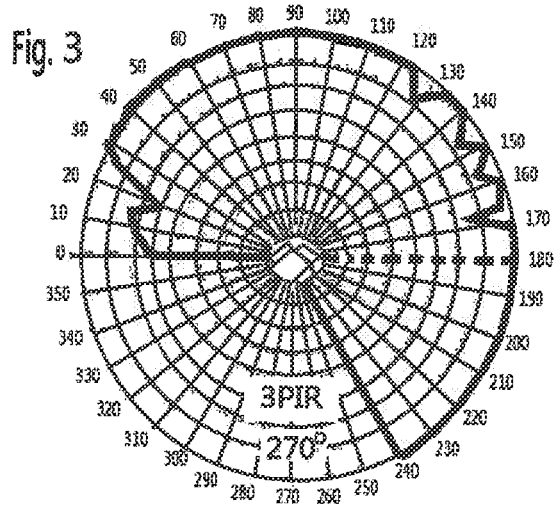

Microwave Module :

Antenna diagram:

Fig. 28
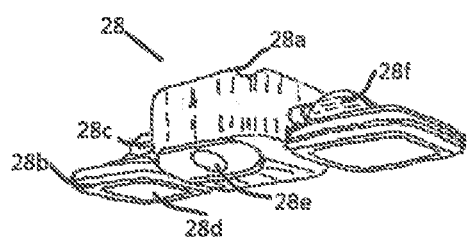
Fig. 29
2 round
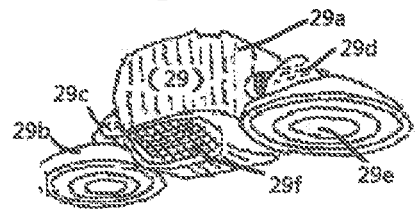
Fig. 30
3 head
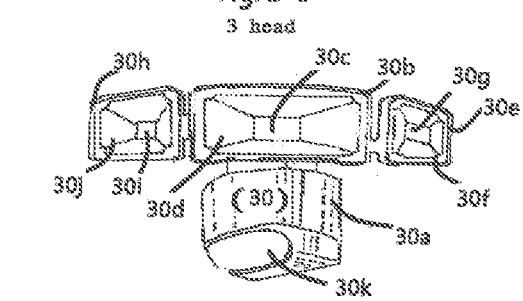
Fig. 31
2 1/2 ball
@360 degree
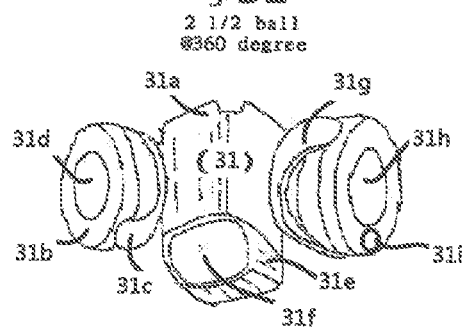
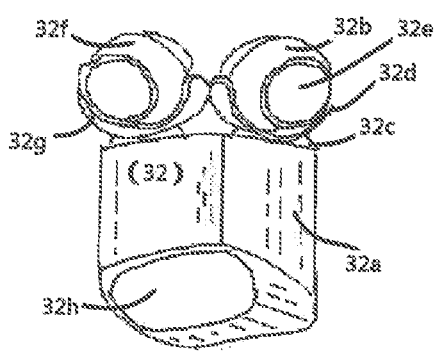
2 1/2 ball
@360 degree
Fig. 32
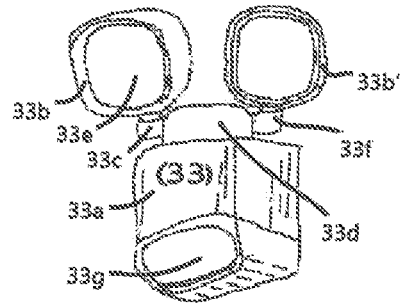
square
Fig. 33
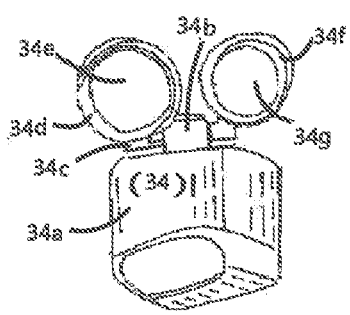
2 Oric
Fig. 34
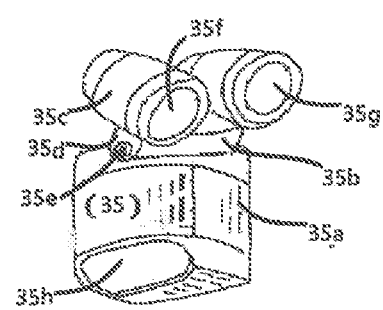
2 cylinder
Fig. 35

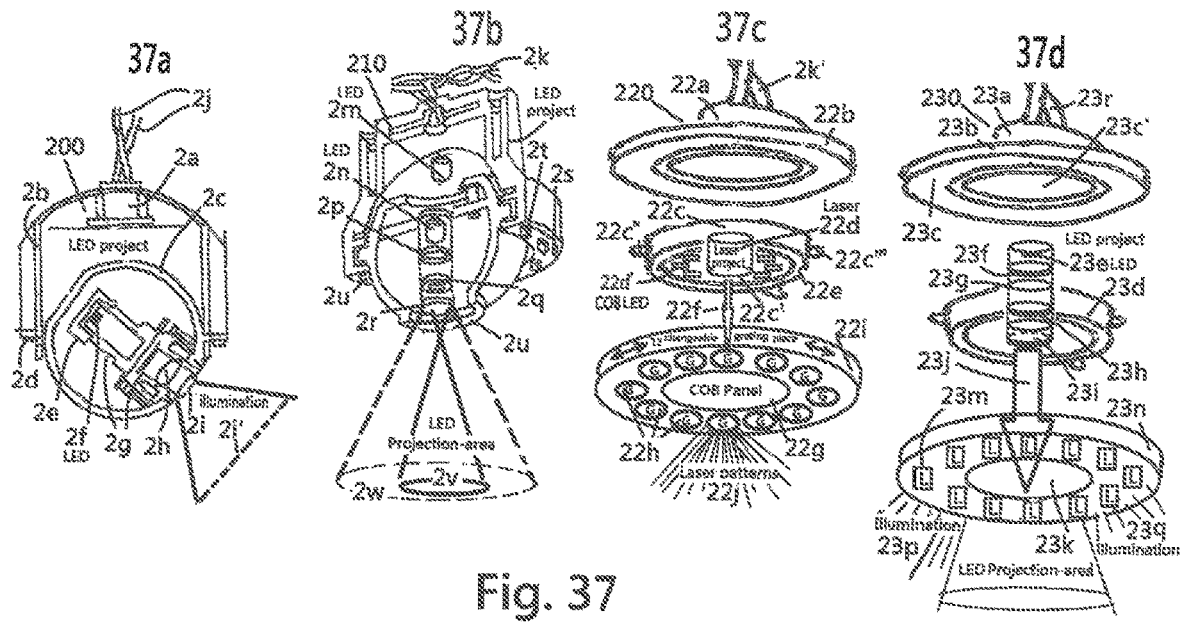
Fig. 37
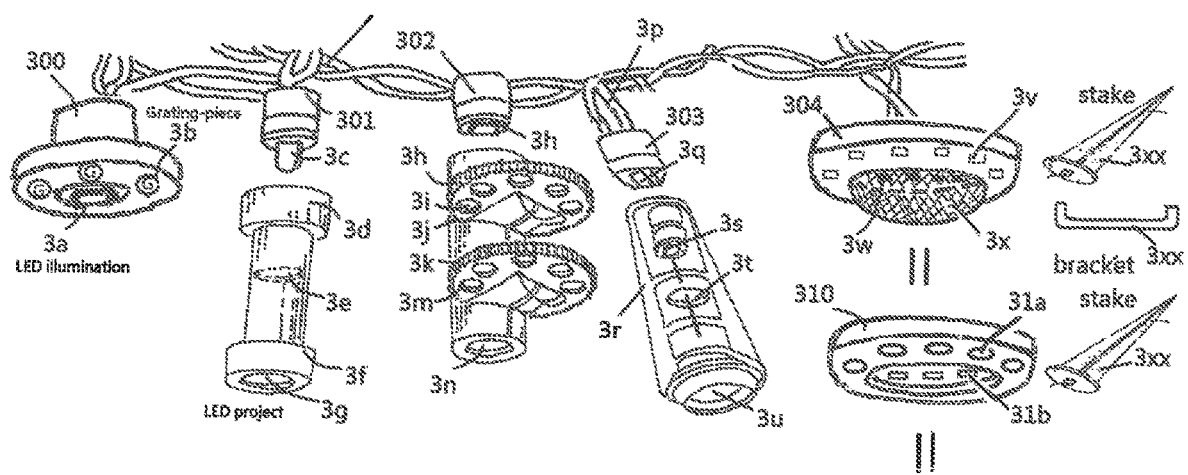
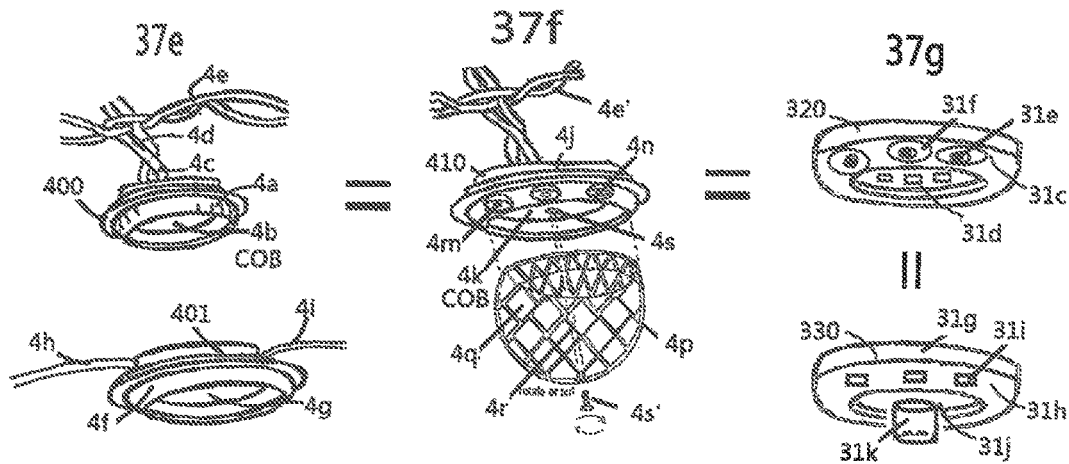

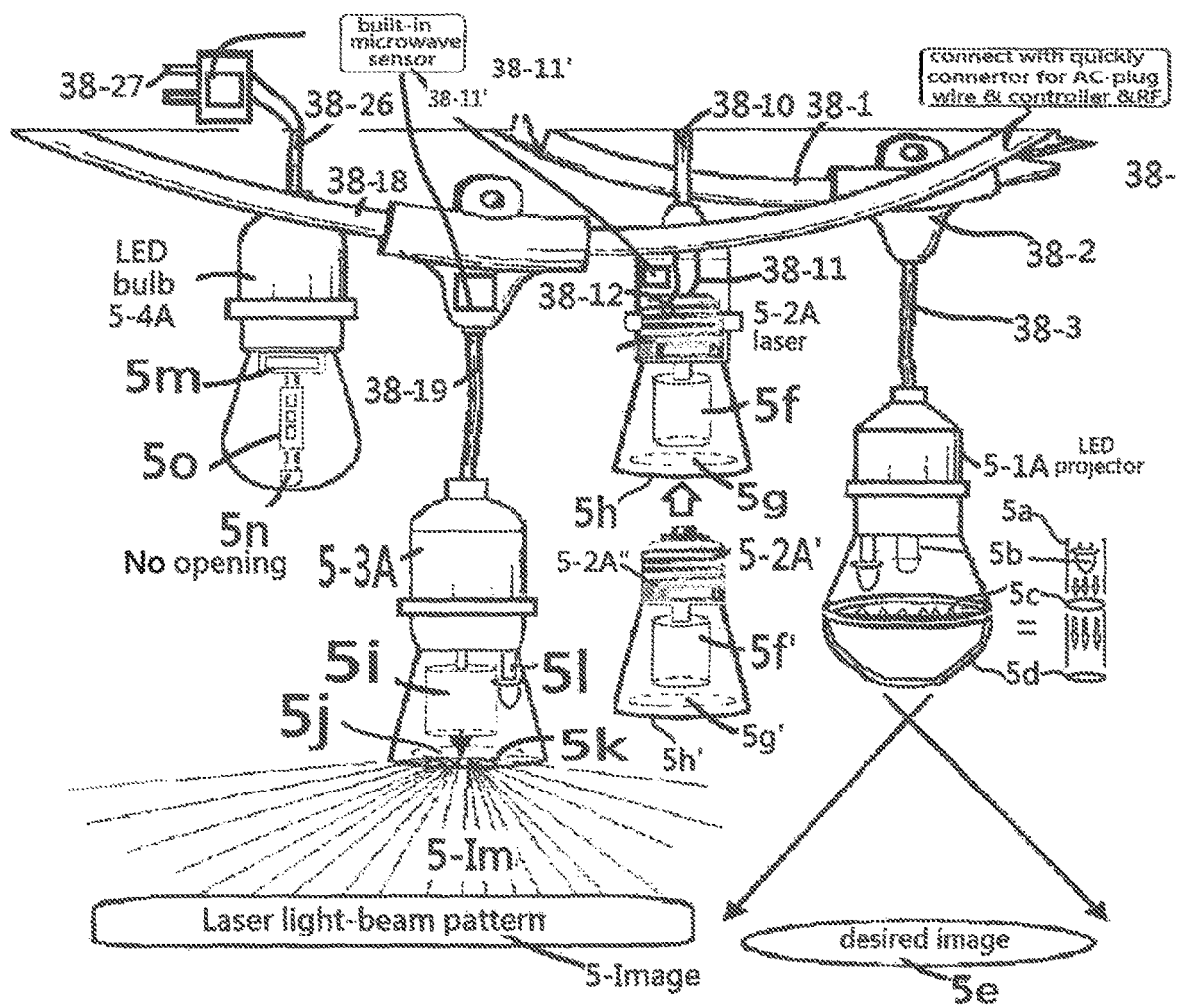
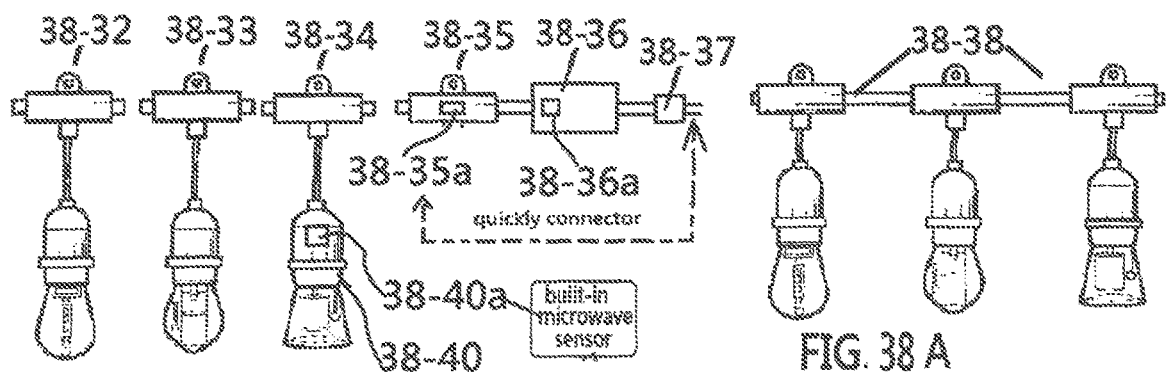

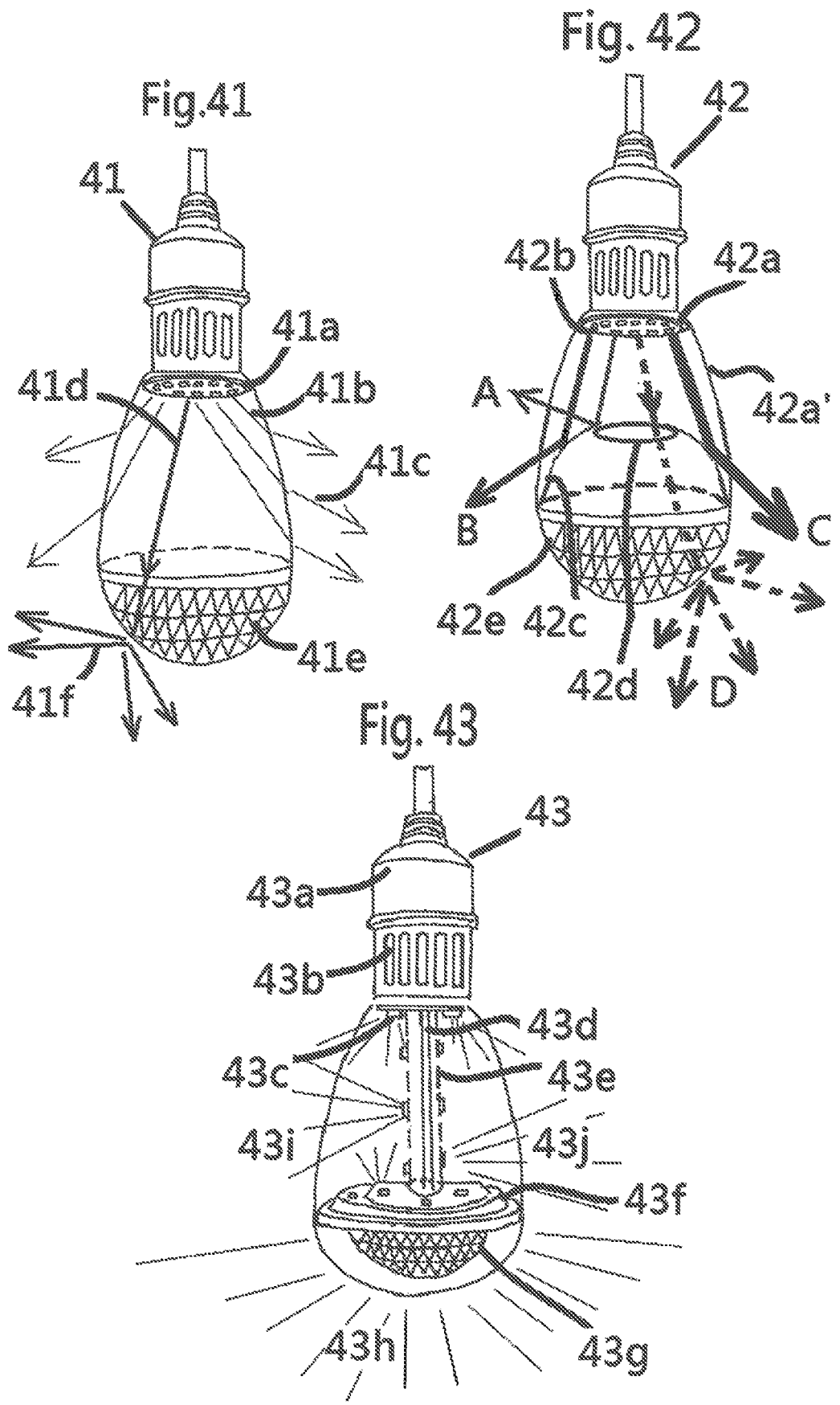

MICROWAVE-SENSOR APPLICATION FOR LIGHT OR ELECTRIC DEVICE

RELATED CO-INVENTOR CO-PENDING APPLICATION CASE

This is Continue in Part filing for
(#FF-5) U.S. application Ser. No. 15/730,291, Filed on Oct. 11, 2017 which is Continue in Part of
(#FF-4) U.S. application Ser. No. 14/968,862, Filed on Dec. 14, 2015 which is Continue in Part of
(#FF-3) U.S. application Ser. No. 14/539,267, Filed on Nov. 12, 2014 which is Continue in Part of
(#FF-2) U.S. application Ser. No. 14/275,184, Filed on May 12, 2014 which is CIP for filing of
(#FF-1) U.S. application Ser. No. 12/886,832 filed on Sep. 21, 2010 now is U.S. Pat. No. 8,721,160 which is CIP for filing of
(#FF-2008) U.S. application Ser. No. 12/318,470 filed on Dec. 30, 2008 now abandoned, which is Division for filing of which is Division for filing of
(#Q-2007) U.S. application Ser. No. 11/806,284 Filed on Dec. 15, 2007 now is U.S. Pat. No. 7,630,004

This filing is Division filing of
(#ZZZ-4) U.S. application Ser. No. 14/296,599 Filed on Oct. 18, 2016 which is Continue In Part filing of
(#ZZZ-3) U.S. application Ser. No. 14/503,647 filed on Oct. 1, 2014 now is U.S. Pat. No. 9,719,654 which is Division filing of
(#ZZZ-2) U.S. application Ser. No. 14/451,822 filed on Aug. 5, 2014, which is Continue In Part filing of
(#ZZZ-1) U.S. application Ser. No. 14/323,318 filed on Jul. 3, 2014 which is Continue In Part filing of
(#ZZZ-13) U.S. application Ser. No. 14/023,889 filed on Sep. 11, 2013.

Related to the wider area image or project image night light or LED bulb or AC plug wire LED outdoor light with or without motor/spin/rotating kits for moving image.

This filing is Division filing of
(#QQQ-3-1) U.S. application Ser. No. 15/816,260 filed on Nov. 17, 2017
which is continue in part of
(#QQQ-3-2) U.S. application Ser. No. 15/730,150 filed on Oct. 11, 2017
which is continue in part of
(#QQQ-7) U.S. application Ser. No. 15/494,777, filed on Apr. 24, 2017
which is continue in part of
(#QQQ-6) U.S. application Ser. No. 15/355,515 filed on Nov. 18, 2016 which is continue in part of
(#QQQ-5) U.S. application Ser. No. 15/341,782 filed on Nov. 2, 2016 which is continue in part of
(#QQQ-4) U.S. application Ser. No. 15/348,218 filed on Nov. 10, 2016
which is continue in part of
(#QQQ-3) U.S. application Ser. No. 14/983,993 filed on Dec. 30, 2015
Now is allowanced which is continue in part of
(#QQQ-2) U.S. application Ser. No. 14/289,968 filed on May 29, 2014
Now is U.S. Pat. No. 9,551,477 which is continue in part of
(#QQQ-1) U.S. application Ser. No. 14/280,865 filed on May 19, 2014
Now is U.S. Pat. No. 9,581,299 which is continue in part of
(#QQQ-2012) U.S. application Ser. No. 13/540,728 filed on Jul. 3, 2012 now is U.S. Pat. No. 8,834,009 which is Division filed of
(#JJJ-1) U.S. application Ser. No. 13/296,469 Filed on Nov. 15, 2011 now is U.S. Pat. No. 8,711,216.

BACKGROUND

The microwave-sensor (hereafter as MS) which is basing on the Doppler radar theory design sensor to detector moving objects, its frequency around 10.525 GH and working voltage can be wider range from 5-24 volt with detect range for 360 degree with 0.3-10 meter (1 to 30 feet) distance.

Compare with the market current PIR motion sensor, or moving-detector sensor which has no limited sensor range such as 120, or 140 degree for 1 PIR sensor, or sensor range only 230 to 270 range, or 3 PIR sensor which to make up the 2 PIR-heads for detected lower position. However, In order to make wide PIR motion sensor angle is need increase PIR-head from 1 to 2 or more 3 PIR-head. The cost will dramatically increase while increase the digital PIR-head from 1 to more.

Also, the PIR motion sensor also is very bad for the current environment changing for summer or hot-areas while the ambient or environment temperatures higher than human-body temperatures the PIR motion sensor will has false or even said crazy wrong trigger because the PIR motion sensor is detect the moving object body temperatures. Under the Environment changing the PIR motion sensor is no more a reliable sensor for many areas worldwide.

The said Microwave sensor which is not affected by the temperatures, humility, light brightness, airflow, dust affection, it can installed inside thicker glass, plastic, wooden, or non-metal material without any interruption or affection the wireless electric signal for detection or transmission so it is very good for safety or security device which is big improvement for marketing LED or laser or both light source light-device including (i) night light, (ii) security light, (iii) power fail light, (iv) torch light, (v) landscape light, (vi) torch light, (vii) light string, (viii) patio light, (ix) Remote control light, (x) ceiling light, (xi) light bar, (xii) punk light, (xiii) cabinet, undercabinet light, (xiv) other motion detect light device, or (xv) RF linkable system which transmitting electric-signals to other receiver to make desired functions.

The current invention for Microwave sensor (MS) application for LED or Laser or both light-source light device has following features including:

1. Detection angle is 360 degree.
2. Detection is not affect by environment temperatures such as higher than human-being body temperature,
3. Detection is not affect by humility, light, airflow, ash, dust so it is nature for anti-environment sensor unit.
4. Not Affection detection while (MS) inside of thick thickness or walls or block-items
5. Microwave sensor can penetrate glass, plastic, wood, cement or any other non-metal material.
6. Microwave has sufficient sensor distance cover whole 360 degree angle.
7. Microwave can incorporate with photos sensor or other sensor to make day or night or both controlling system.
8. Microwave sensor incorporate with LED or Laser or both light-source light-device can turn on the light-source while people fall within the 30 feet or more far distance from light-device location penetrate all wall, door, garage, fence to offer big convenience than PIR motion sensor.

9. Microwave-sensor unit without light soruce incorporate security or safety light device or other device can detect all moving-object and transmit out the RF or IR or Wifi or Zigbii or Z-way wireless signals to the said other electric or electronic device to activate or trigger or make operation for the other electric or electronic device(s) pre-determined function(s) or transmit other or end RF or IR or wifi or zigbii wireless signals to $2^{nd}$ group of the said electric or electronic device to perform the said linkable or unlimited linkable system which each 30 feet or more far distance for $2^{nd}$, $3^{rd}$, $4^{th}$ group so can link $1^{st}$ one to $2^{nd}$ one or to more N-th group.

10. Microwave sensor-unit without built-in light-source to emit out RF signal to other electric device or light-device which has RF receiver to communicate with sensor-unit emit out RF signal to operate the pre-determined light effects.

So, the microwave sensor (MS) is the best choice to make big improvement for current market all kind of motion detect light device including but not limited for example the said security light or security device or light-string or landscape light or multiple light-source light device which incorporate with PIR motion sensors as the above and abstract discussion.

BRIEF DRAWING

1. FIGS. 1, 2, 3 show the PIR motion-sensor for 1, 2, 3 PIR-unit to get 150, 180, 270 degree detect-angle and distance.

2. FIGS. 4, 5, 6, 7, 8 show the microwave-sensor for one-unit to detect 360 degree on orientation of X+Y-axis surface and high-low overview or in Z-axis for height detect-angle and hi-low and distance.

3. FIGS. 9, 10, 11, 12, 13, 13A, 14, 15, 16, 17 show the apply the microwave-sensor for all kind of LED or laser or both light-source light-device including night light, power fail light, desk-top lighting, garden light, patio string light, seasonal string light, landscape light string, drive way lighting, living room light, bed room light for indoor or outdoor applications and can detect moving-object and penetrate the wall, concreate, wooden, plastic except the metal material with walking examples.

4. FIGS. 18, 19, 20, 21, 22, 23, 24, 25, 26 show the microwave-sensor apply the Doppler theory with preferred photo-sensor (CDS) for lighting applications including working flow-charter, some examples of the circuit diagram, some preferred module with different terminals connection for DC or AC applications and the antenna diagram.

Figure 27:
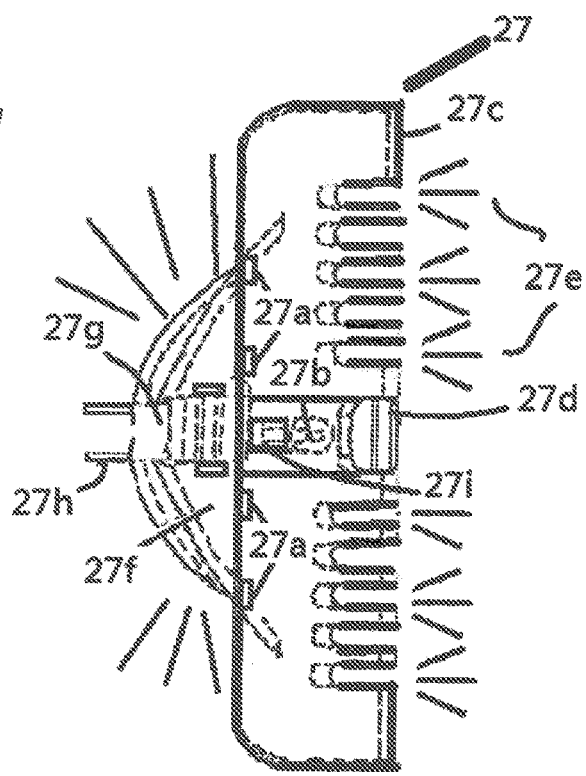

5. FIG. 27 is the $1^{st}$ embodiment for the (i) LED (ii) COB LED (iii) organic-EL or organic LED (iv) laser (v) LED and laser light-source light device which is plug-in night light with built-in microwave-sensor.

6. FIGS. 28, 29, 30, 31, 32, 33, 34, 35 show some models of preferred embodiment for the security lights which can be powered by DC or AC power source with different number of angle-adjustable (i) LED (ii) COB LED (iii) organic-LED or organic-EL light-unit(s) light device and circuit compartment and to get up to 360 degree sensing angle with hi-low Y-axis for height without affect by (i) over 38 degree ° C. ambient temperature like PIR motion sensor, (ii) UV, Sun, Water, Moisture, (iii) block-object at least of glass, wood, plastic, pottery wall, divider, shade, hood. These are impossible for PIR motion sensor which never can penetrate to detect other space with these block-objects between the light and microwave-sensor device.

7. FIGS. 36A to 36U show some or preferred (i) LED or (ii) COB LED or (iii) organic-EL or organic-LED DC powered light device for outdoor security light or safety light applied microwave-sensor(s) and other electric or mechanical parts and accessories including (i) desired shape, (ii) adjustable construction, (iii) detachable light source, (iv) detachable sensor-unit while replaceable, or (v) light has up-grade digital device which including built-in camera, wifi, wireless communication to cloud work with download APP through 3/4/5 G network and make operation or adjustment or selection or comparison on communication device display or screen, or (vi) powered by batteries, AC-wire, wired, built-in or outside transformer, Energy storage-unit(s) for solar module/wind power/chemical power/other, generator(s).

8. FIGS. 37 and 37a to 37g show the some preferred light-string, landscape light-string, café-light, patio light-string, seasonal/holiday light-string has one or more than one of the light effects which can change or select the preferred or desired (1) light functions, (2) LED(s) or laser color, (3) LED or laser light moving model, (4) LED or laser Light brightness or dimmable brightness, (5) light source trigger device by switch, remote controller, linkable RF transmitting and RF receiver with different device has built-in RF transmitter and other different device has built-in RF-receiver for remote or far distance from 30-300 feet, (5) quickly connect unit which has built-in electric parts and accessories to make the said above (1) to (4) functions, (6) one or more of the optics-lens or optic-cover or laser-light source with its one or more layers of grating-piece(s) in stationary or movable or rotating arrangement(s) to create the Both LED and Laser light effects or-and functions in one light string device which is linkable by wired or wireless construction especially can work for RF transmitter from one light-string, microwave-sensor to other separated light-string with RF receiver while for wireless communication. Or/to other separated light-string watthour RF receiver while for wired connected with light-string had the built-in controller.

9. FIGS. 38 and 38A show the alternative or replaceable or equal function light-string which has injected-sealed unit for the LED or laser or both light-source light-units for floor light, garden light, landscape light, torch light, Floor light to offer the outdoor patio, garden, landscape, wall, building, house for not only the said LED accent light, torch light, floor light, illumination but also had the Laser light effects for all kinds from market available type such as laser spot-lights, array-light, dot-matrix light, contour light, shape light in desired colors, size for illumination or projection including illumination, light-beam, patterns, image to desired place on desired time, cycle, duration, period of time.

Figure 39:
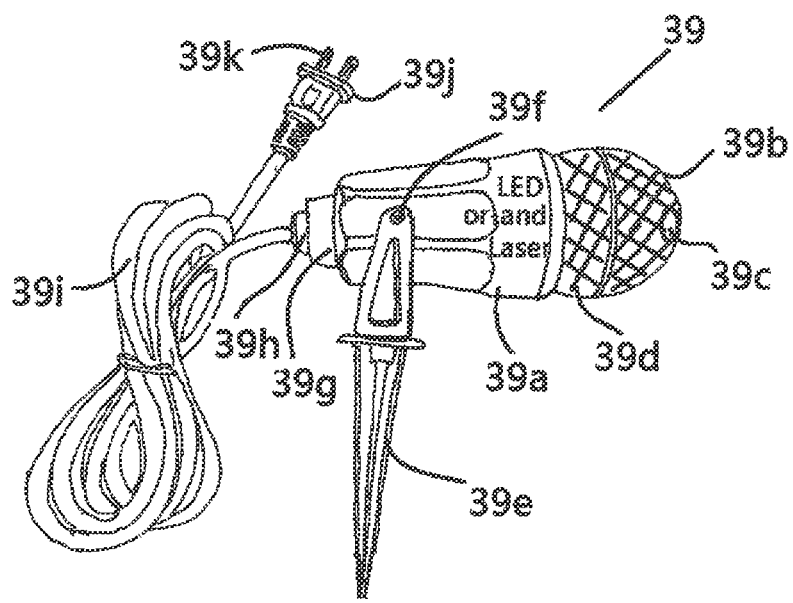

10. FIG. 39 show the one of plurality of different type of microwave-sensor LED or Laser or both LED/Laser Garden light application incorporated with the photo-sensor (CDS) to instead the IR or RF remote-controller or simple (CDS) photo-sensor to control the said LED or-and Laser garden light to turn on-off. This application also can offer the security light while adapted the microwave-sensor basing on the FIG. 17.

Figure 40:
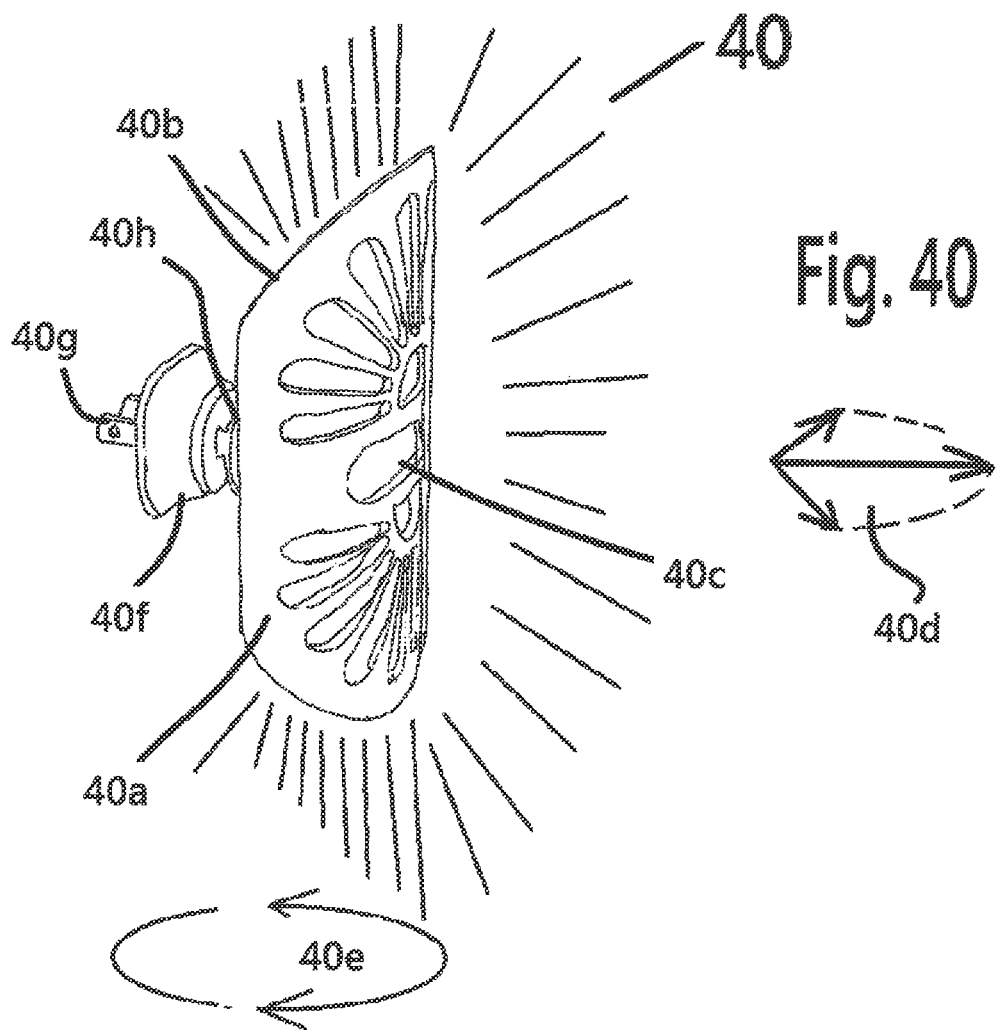

11. FIG. 40 is other embodiments for plug-in night light which has (1) top and bottom emit light-beam, or (2) angle changeable function to make the said LED light to different direction, or (3) the night light has one or more than one of side-light which can adjust angle to emit light to desired location(s) to emit light-beam or project lighted patterns or images to remote areas while the optics-lens is in-front-of the light-source as co-invention filed case (#TT-Division).

12. FIGS. 41, 42, 43 which show the three preferred injection bulb or assembled-bulb which has more than one of the light-functions which can changeable by switch, sensor, remote controller, sound activated to offer not only illumination but also $2^{nd}$ other functions selected from (i) party light, (ii) project light, (iii) rotating-light, (iv) color-changing light, (v) accent light, (vi) . . . etc.

Figure 44:
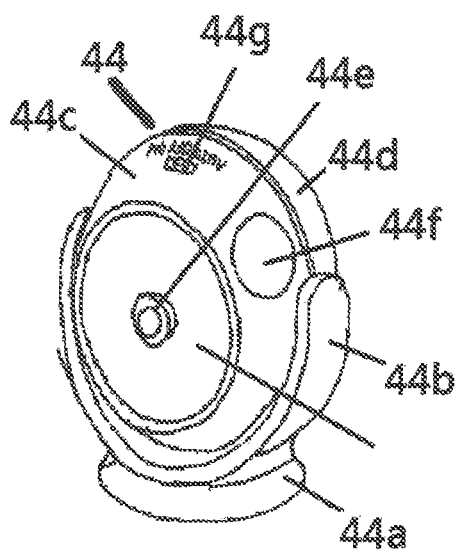
Figure 45:
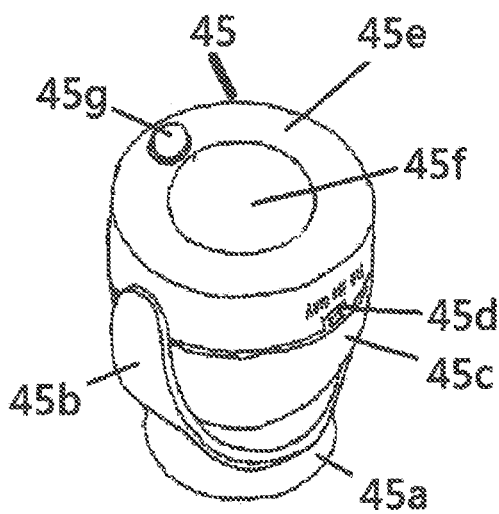

13. FIGS. 44, and 45 are preferred embodiments for battery operated LED or COB LED or organic-EL or organic-LED light device which has built-in microwave-sensor while people walk within the x-axis surface and within the y-axis for high-low level areas.

Figure 46:
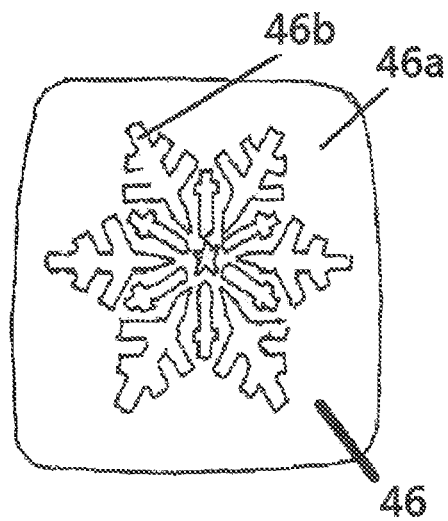
Figure 47:
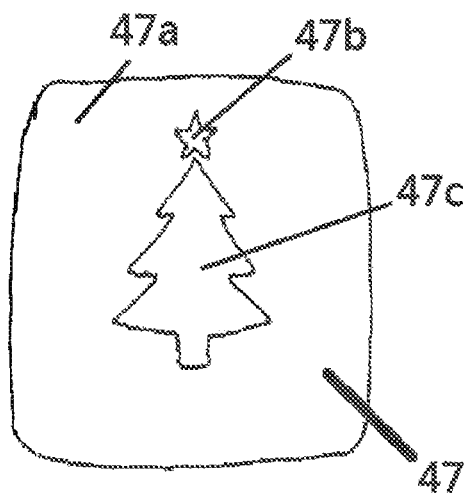

14. FIGS. 46 and 47 are preferred other embodiment for seasonal night light which has built-in microwave sensor so can has desired light illumination with seasonal display for desired illumination brightness, function, duration.

Figure 48:
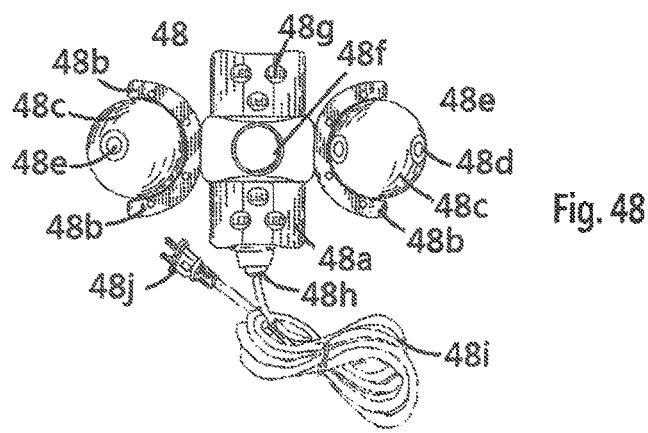
Figure 49:
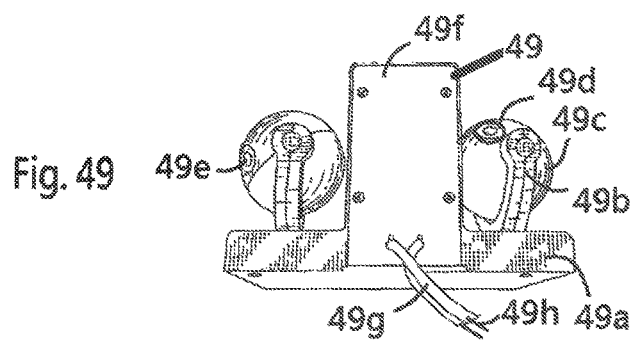
Figure 50:
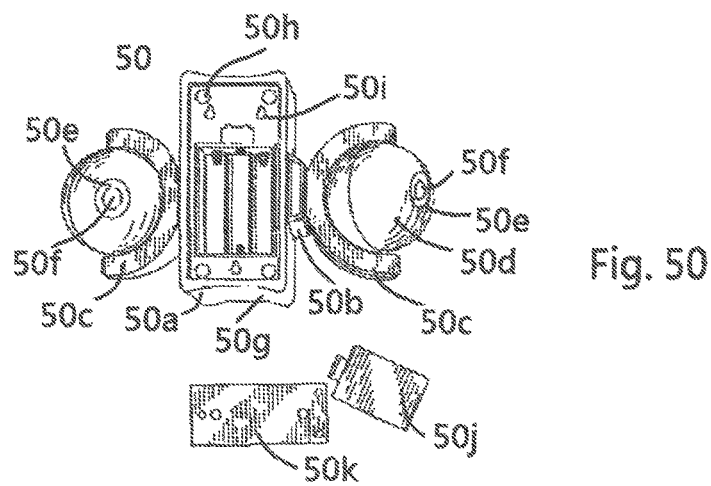

15. FIGS. 48 and 49 and 50 are another light device which offer the multiple direction light effects in front, and sides including housing-part or prong with angle adjustment to offer desired locations in front, sides, top, bottom, right, left by COB light-source or by project light assembly which has optics-lens to project the light on near-by or remote away locations.

Figure 51:
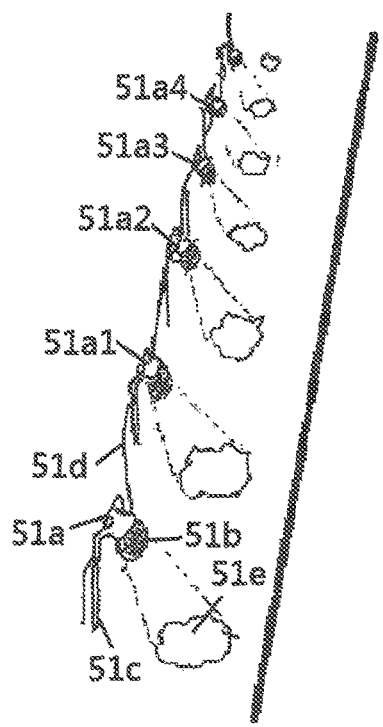

16. FIG. 51 is one of preferred embodiment which for landscape or garden or outdoor light-string with optics-lens or optics-elements for LED or laser or both light-source with stake or base to install on the outdoor applications.

Figure 52:
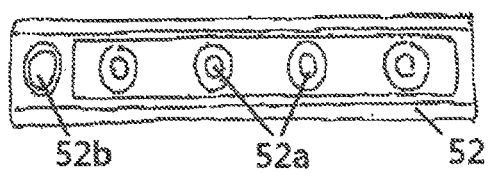
Figure 53:
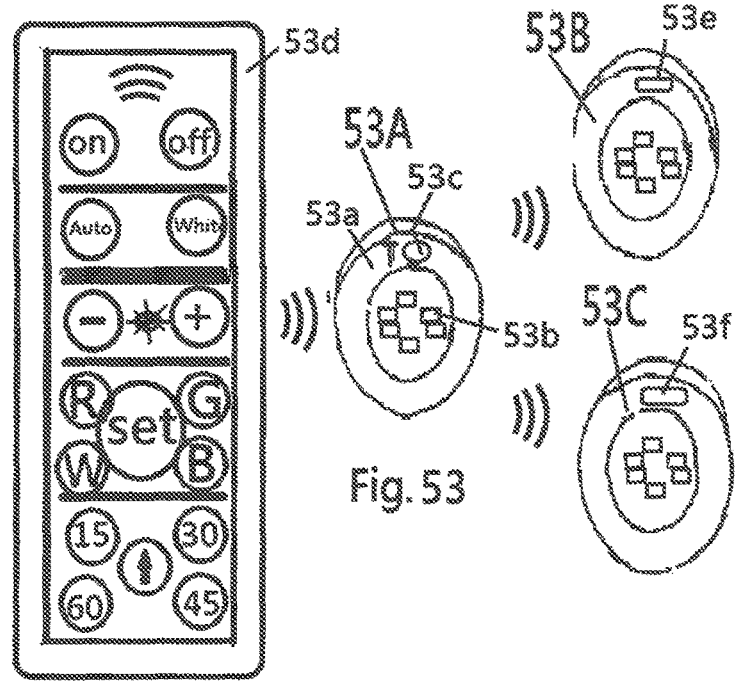

17. FIGS. 52 and 53 show the preferred light-bar and punk light has built-in microwave-sensor and RF remote controller for motion detect light device with many setting, adjustment, program desired functions and linkable other device or light-unit(s) by RF transmitter and RF receiver.

Figure 54:
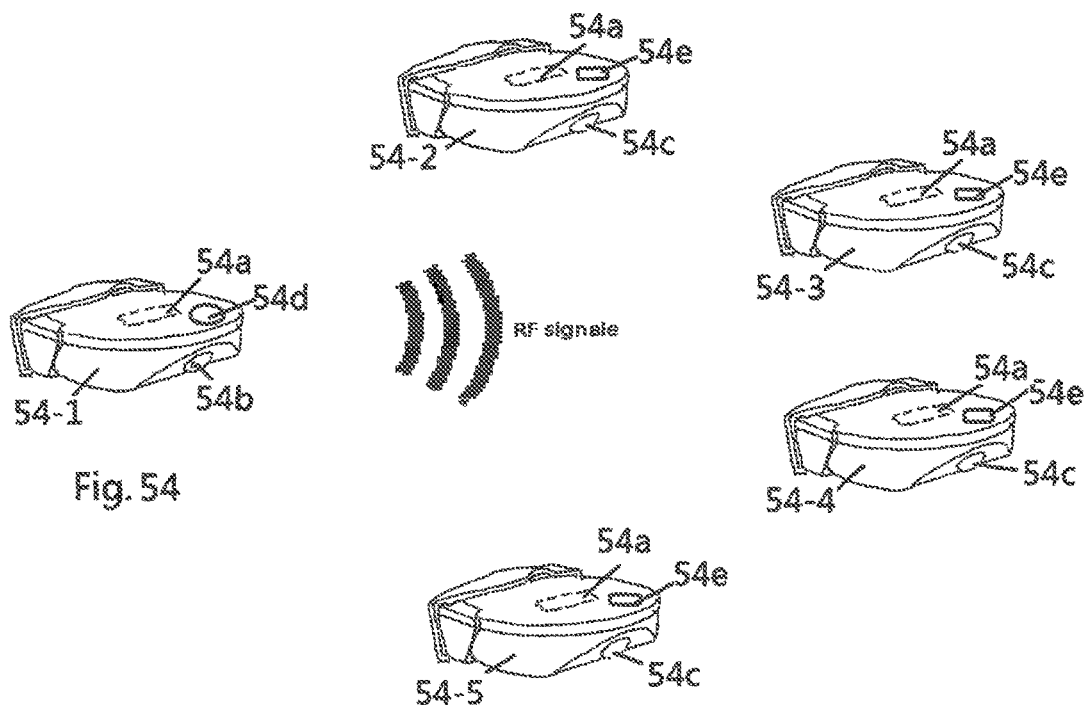
Figure 55:
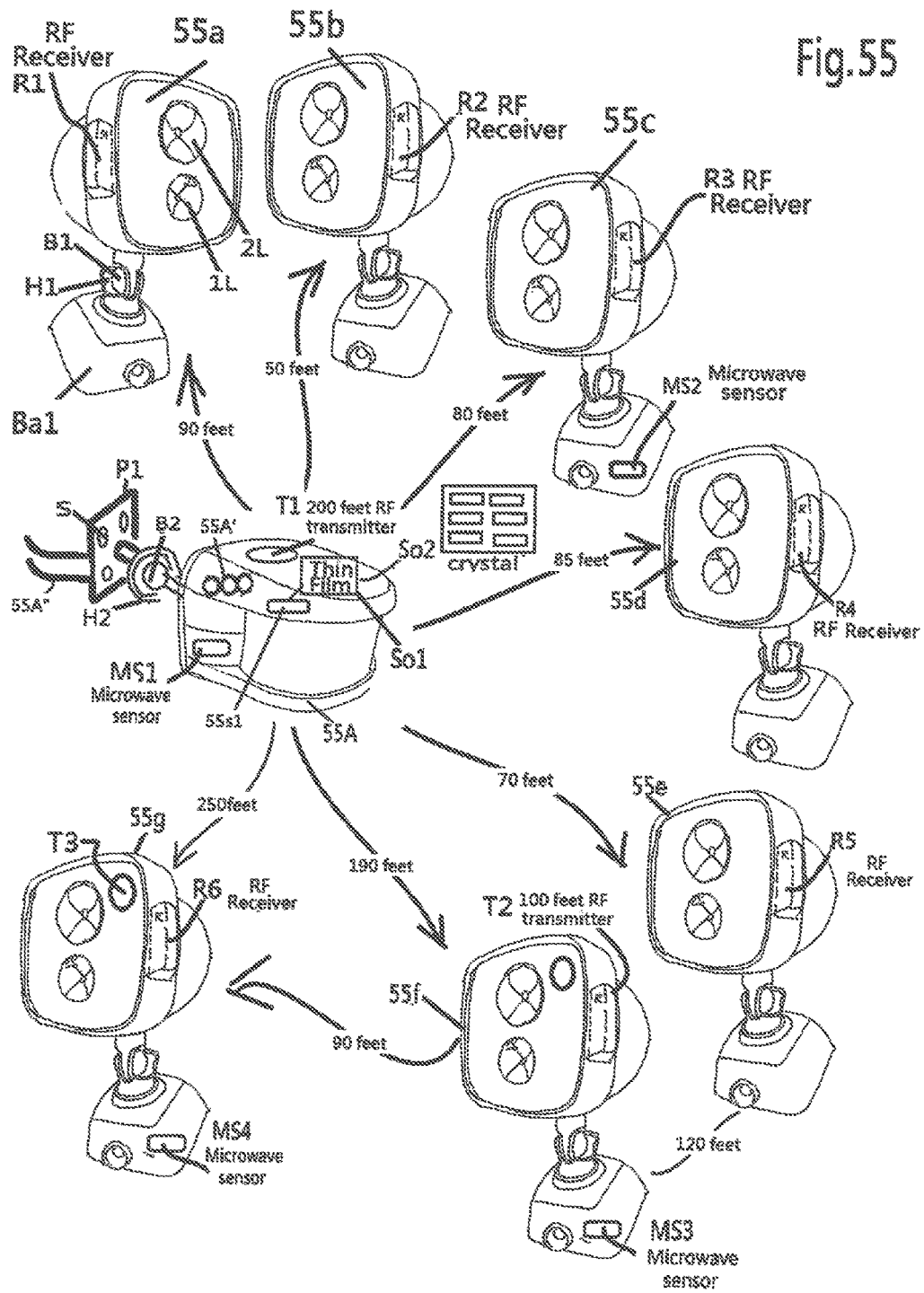

18. FIGS. 54 and 55 is alternative wireless linkable device which has microwave-sensor unit without built-in light-source but has built-in RF transmitter to deliver the RF signal to other electric-device(s) or light-unit(s) while detected the moving object(s) under dark environment so can trigger other-device or light-unit(s) within the RF transmitter cover range such as 100 feet or 200 feet or other distance.

Figure 56:
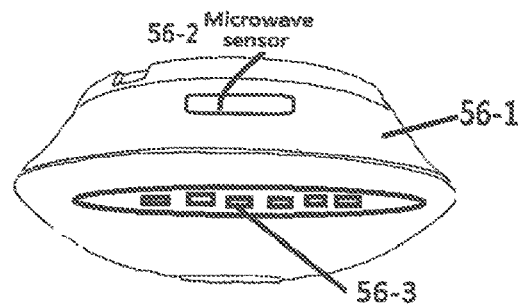

19. FIG. 56 is other application for light-unit which has built-in microwave-sensor unit for ceiling light, or cabinet light or downlight which powered by AC-wired or battery powered.

It is appreciated that all above Figures or drawing for all kind of light device which is powered by AC-wired, AC-plug-wire, prong, battery, DC storage-unit(s) for solar-module or wind power for LED or laser or both light-source should be still fall within the current invention which not affect by ambient temperature, dust, UV, humility and with approximately 360 degree in x+y axis area and some height in Z-axis detection areas which is impossible get by PIR motion sensor for all light device application. Especially for current world environment changing during summer time all outdoor or even indoor ambient temperatures is higher than 35-38° C.

DETAIL DESCRIPTION

The current invention make big improvement for PIR motion-sensor limited degree of detect-angle problem as above FIGS. 1, 2, 3 show for each one of PIR sensor-head for around 120 to 150 degree. If need more wider detect-angle need to add one or more PIR sensor-head(s) to get up to 240 to 270 degree or detected the up & down levels. However to apply the current invention FIGS. 18, 19, 20, 21, 22, 23, 24, 25, 26 microwave-sensor can get the FIGS. 4,5 for both 360 degree of surrounding areas with variable distance and hi-low areas in y-axis detection-areas to offer the best sensor-range and sensor-levels than PIR motion sensor.

Furthermore, the PIR motion-sensor is very sensitive for environment or ambient temperatures because PIR motion-sensor is detect the moving-object(s) body temperatures so while the environment or ambient temperature is higher than human-body temperatures such as 38 degree Centigrade (° C.), the PIR sensor-head will be affected and send out false-trigger. This is major problem while the world environment is higher and higher for many location all over the USA and other continental. The current invention for microwave-sensor is not affected by the environment temperatures, moisture, water, dust is the Biggest benefits for current invention to incorporate with microwave-sensor for all LED or COB LED or Organic EL or Organic LED or laser light source.

The $3^{rd}$ features for current microwave-sensor has penetrate wall, glass, fence, wood, pottery, brick, cement or all other material except the metal which is impossible for the PIR motion-sensor so the said PIR motion-sensor is not able to fit within the glass, lamp shade, lamp cover for many lighting applications.

The $4^{th}$ feature for current microwave-sensor penetrate glass, wall, fence, brick, cement properties can offer people not only the detect the indoor, garden-area, patio-area, pathway, drive-way, but also outdoor, outside garden, outside patio, outside pathway, outside drive-way adjacent-areas, walkway, garden also fall within the detect-areas and turn on the said desired device for examples the plug-in wall outlet, desk lamp near the wall, floor-lamp near the wall, security light on top of garage door, door-bell or entrance light install on the entrance door adjacent wall, or garden light near the garden fence or garden wall or garden tree-bush. These near-wall or near-fence or near plant or near tree-bush installation night-light or garden-light or patio light, landscape light, light-string, project-light, security light while install on traditional locations and also will triggered and turn-on while people not only in outdoor or indoor but also will be triggered by indoor or outdoor because the light-device or other device has built-in microwave sensor can penetrate the wall, dividers, glass, wood, cement wall, fence, wood, plant, bush.

Basing on the above four major features for current invention, hereafter has details descriptions;

From FIGS. 1, 2, 3 shown PIR motion-sensor for actually walking testament for trigger point from each 10 degree for whole circle 360 degree with distance from center to each circle.

The FIG. 1 show the only 1 PIR motion sensor test result normally only can get 120-140 degree basing on the PIR motion sensor Fresnel-lens is good design or copy unit.

From FIG. 2 shown the 2 PIR motion-sensor walking testament data which has 2 PIR-heads has angles between the 2 PIR-head and each face the different front-areas. Basing on the 1 PIR-head normally get 120-140 degree so the 2 PIR motion sensor will get 240 to 280 degree, however, because the majority manufactures only use copy Fresnel lens and wrong design for the PIR-head(s) related angle so majority market 2 PIR motion sensor get only 180-220 degree but the cost is dramatically raised because need pay for one more PIR-head and bigger Fresnel lens.

From FIG. 3 shown the 3 PIR-head(s) basing on one of PIR-head can get 120-140 degree detect-area and around 100 feet distance so the 3 PIR-head(s) should get over 360 degree however, basing on the wrong arrangement for 3 PIR-head(s) for each related position and use copy Fresnel-lens so market only get max only 270 degree. However, this also have big issues for cost need to add 2 more PIR-head(s) expensive cost but only get limited angle increase and not up to desired 360 degree.

From FIGS. 1, 2, 3 for PIR-motion sensor for cost and detect-areas analysis, The other big trouble for PIR motion-sensor is very sensitive for environment or ambient temperature and this is very bad for current worldwide strange weather especially for summer for hot weather.

PIR motion-sensor mainly to detect the moving-object(s) body temperatures, other words the PIR motion-sensor detect the Centigrade temperature range around 36 to 38 degree (° C.). However, during summer even for night time majority areas has outdoor temperature is over 36-38 degree (° C.), so many false trigger happened all the time.

The PIR motion-sensor need front Fresnel to collect all incoming electric-signal and which has a lot optic-lens designs on surface which is other Big problem to get accumulated dust, ash, sand so will block the electric-signals to transmitting and receiving. This is $2^{nd}$ major problem for all PIR motion-sensor for period of time it will out of standard function because affected by ash, dust, sand . . . etc.

The PIR motion-sensor electric-signal can not penetrate the glass, lamp shade, brick, wood, cement, or any other material. So, all PIR motion-sensor device have to Fresnel-lens exposed to people so can operate pre-determined functions.

Figure 4:
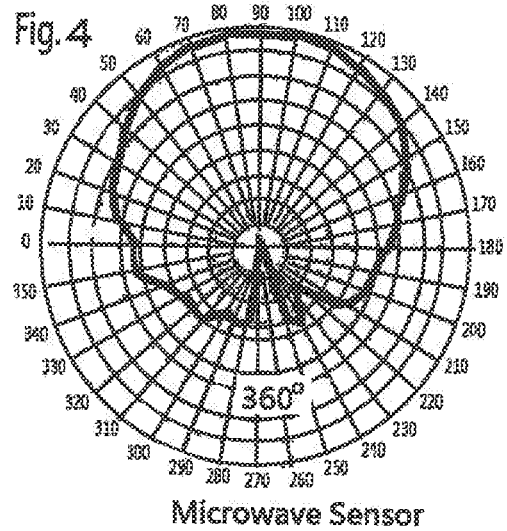
Figure 5:
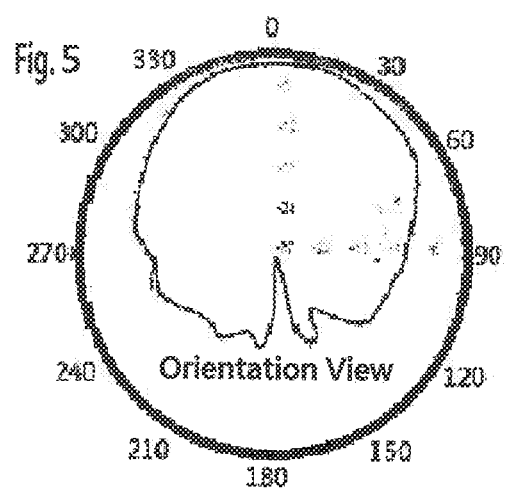
Figure 6:
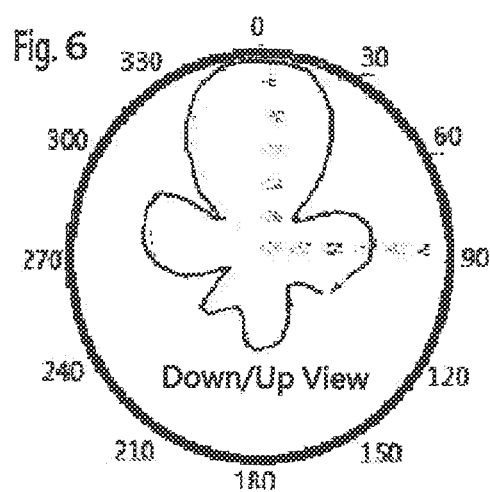

From FIGS. 4, 5, 6 shown the current invention for microwave sensor which is install within the housing because microwave sensor can penetrate the glass, lamp shade, brick, wood, wall, cement, floor material. It also can penetrate the different floors (height) within the designed range in y-axis that is means high-and-low such as FIG. 6. It also the microwave sensor can cover all 360 degree as FIG. 4 even deducted the some blind-area which no trigger-points for walking-test such as FIG. 4 still has 20 degree less than 360 degree.

From FIG. 5 shown the microwave-sensor for detect-areas in X and Y-axis which cover whole 360 degree.

From FIG. 6 show the microwave-sensor for detect-area in Z-axis which cover the vertical distance to cover the high-and-low levels, so the device install on the ground-floor it also can be triggered on $2^{nd}$ floor while people on $2^{nd}$ floor walk into the trigger-areas. For examples, the desk lamp is install near the wall, or plug-in night light plug-into wall outlet which only 1 feet above ground level floor, or outdoor security light install on ground-floor garage door, while people walking on $2^{nd}$ floor near the sensor-range of micro-sensor so the desk lamp or night light or security light can be triggered. This will help people had free security light device and give bad-guys or theft or burglars a instantly light brightness to let bad guy back off for bad idea. This will scare the bad guys ran-away because someone notice bad-guy interrupted house, garden, driveway and people no risk for harm because people on the $2^{nd}$ level or indoor which is far-away of microwave sensor application lighting or other device. Those microwave-sensor application lighting or device has detect-areas as FIGS. 7 and 8 show.

From FIGS. 9, 10, 11, 12, 13, 14, 15, 16, 17 shown the different areas including indoor living room, bed room, bed room, garage, garden, patio, drive way, path way has install the said microwave-sensor lighting or other device including but not limited for alarm, RF receiver device, sound maker device for all kind of market available (1) desk/Floor/ceiling lamp, (2) night light, (3) power fail light, (4) light-bar, (5) light-string, (6) cabinet light, (7) garden light, (8) Patio light, (9) landscape light, (10) security light, for indoor or outdoor use, for different power source including but not limited for (a) AC, (b) DC, (c) outside transformer, (d) energy storage device of solar, chemical, wind power, (e) power bank.

From FIG. 9 can see The LED light device including night light (9*a*) install on indoor living room and one desk lamp (9*b*) install near the wall and one light-bar or 3 LED-unit restroom-lighting (9*c*) install on wall; those all had built-in microwave-sensor to detect the indoor x-y axis surface basing on the microwave-sensor specification. While people walk within the detector areas (circle) will turn on the said LED light device (9*a*) (9*b*) (9*c*) respectively. Because the microwave-sensor detect-areas is almost cover 360 degree in x-y surface so while people (p1) (p2) (p3) walk within the microwave-sensor detect-area of outdoor, the indoor installation LED light (9*a*) (9*b*) (9*c*) also will be triggered and turn on under pre-determined functions and effects. If the People (p1) (p2) (p3) is bad guy and close the people housing, the indoor light will instantly to turn-on, so bad-guy will see light is turn-on and think people is alert someone get into residence house so will give-up or back-off from bad idea. This is the one of the current invention to apply the microwave-sensor which not only can be trigger indoor but also can triggered at outdoor basing microwave-sensor has almost 360 degree detect-area and also can penetrate all material wall except the metal wall or material.

Same as the FIG. 10 show the indoor have built-in microwave-sensor plug-in light or AC-Plug wired LED light device including desk lamp (10*a*), night light (10*a*), light string (10*b*) or multiple LED light LED ropes (10*b*) which has pre-determined detect-areas depend on the different specification of the microwave-sensor design. While people walk fall into the microwave-sensor detect-area indoor will turn on the said LED device (10*a*) or (10*b*). Basing on microwave-sensor detect-area cover almost 360 degree and can penetrate the all kind of material except metal so even people walk within the detect-area(s) even at outdoor still will trigger the said indoor LED light device such as people (p4) (p5) (p6) will trigger the indoor lights (10*a*) (10*b*). This also offer people while they back to home and fall within the detect-areas, the people can get good brightness before step into home. This is much convenience than the RF remote controller or the said Smart home appliance which need get into home and PIR Motion sensor detect people movement. However, the PIR motion sensor is very sensitive for ambient temperature is higher than people body temperatures 36-38 (100° F.) degree, PIR motion sensor is not reliable for false trigger. Especially during summer season, outdoor temperature over 100-140° F. will cause indoor temperatures easily too high to make PIR had false trigger. The microwave-sensor is no affected by the temperatures so this is most reliable sensor.

From FIG. 11 shown for (A) LED outdoor security light (11*a*) which is AC-wired or Solar-powered or connect with outside transformer AC-to-DC power source which hang-on wall or install on the top of garage, or (B) LED indoor or outdoor Security light (11*c*) which is battery powered light with 1 or 2 or 3 angle adjustable LED-unit(s) which use preferred batteries and install on top of the fence (11*b*), wall (11*b*) of the garden, backyard, garage door, patio, building or on the ground; those had built-in microwave-sensor so can cover sufficient detect-area(s) almost for 360 degree and can the all kind of material except the metal material. From FIG. 11 can see the security light (11a) install on top of garage door with desired detect-area in x-y axis surface to detect the person (p7) activity and turn-on the light. It also can turn on the light (11a) while the indoor people (p8) walk fall within the detect-areas which offer people convenience while at dark environment people (p8) want go out from garage door has sufficient light brightness before step out. The battery powered LED security light (11c) also had other features is while people (p9) near-by the wall of resident house or building instantly turn on the light (11c) so give the brightness or alert to the person (p9) can offer illumination or warning signal to person (p9).

From FIG. 12 shown the outdoor garden, landscape, patio, backyard areas which has all king of light-string, landscape light, or landscape light-string, garden light, accent light, floor light, torch light, or garden projection light or garden projection light-string has more than one functions, other LED or laser or both light device with built-in microwave-sensor to detect moving-objects within the X-Y axis and Z-axis areas. The said LED or laser or both light device such as plug-in outlet or outlet pole LED light (12a), or AC-plug wire or low-voltage powered or solar powered garden light (12b) or project light (12d) or patio light-string (12c) or landscape light or light-string (12c) the all kind of light-string (12c), or other LED or laser or both lighting device can grigger by indoor people (P11) or outdoor passing-by people (p10) or (p11) so can save the outdoor LED or laser or both light device to turn on and turn-off under pre-determined time period with desired chasing, fade-in and fade-out, gradation, color changing, color selection, functions section, brightness setting or adjustable, dimmable, sound activated, photo sensor controller, RF transmitting from microwave-sensor to other device which has built-in RF receiver or $2^{nd}$ RF-transmitting device to $2^{nd}$ ground of other device(s) which has built-in RF receivers. So an make the said outdoor all kind of light, light-string, flood light, torch light, garden light, project light to activate under pre-determined functions, also can give good or bad people (p10) (p11) for illumination or give warning alert to let them give up bad idea.

From FIG. 13 shown above discussed FIGS. 9, 10, 11, 12 which show the all locations applications including indoor (13f), drive way (13g), living room (13h), bed room (13i), patio (13j), garage (13k), garden (13m) has all kind of LED or laser or both light device including plug-in outlet, AC-plug wired, low-voltage connected power source, solar powered, battery powered, outside transformer powered device including security light (13a), or power fail light, emergency light, flashlight, multiple functions light, multiple changeable functions light (13b), or desk top light, reading light, lantern (13c) or all of purpose light-string, landscape light, landscape light-string, floor light, torch light, projection light, garden light, seasonal/holiday light string (13d) for people (p15) (p16) (p18) (p19) (p21) (p22) (p24) for indoor or garden or patio or living room or rest room, bed room walking to trigger the said LED or Laser or both light device for desired functions. It also can give walk-by people (p13) (p17) (p20) (p23) illumination or warning alert while they close people (p15) (p16) (p18) (p19) (p21) (p22) (p24) housing or residence or garden or backyard or patio areas.

From FIG. 13A shown the indoor has LED or laser or both light device here is one of desk/floor lamp (13a-1) or night light (13b-1) which near the wall or corner so allow people walk within the built-in microwave-sensor detect-areas to turn on and turn off under desired functions. The people (p26) (27) (p28) walk within the detect-areas also can trigger the said LED or laser or both light device.

From FIG. 14 show more details for two of preferred LED security light one is AC-wired or AC-plug wire or Solar powered or built-inside or outside transformer powered security light (14b) is install on top of garage door (14a) which has microwave-sensor face outside so can have desired big detect-areas on outside and also has small detect-areas for inside of garage door (14a) so while people inside also can trigger the security light (14b) for offer illumination before people step out to garage-door. From FIG. 14 also shown the $2^{nd}$ battery powered security light (14e) has built-in 4D or more big power DC energy storage unit(s) which is install on outdoor wall (14c), or sit on the wall (14c) or patio (14c) which also can offer big detect-areas for outside areas and also the indoor people can trigger the light (14e) while feel something is at outside. This is more practically than any PIR motion sensor LED or Laser or Both Light device which only can detect narrow angle in front only, Not cover the almost 360 degree and never can penetrate the glass, lamp shade, wall, window, fence, building material, cement at all.

From FIG. 15 shown alternative for living room installation for LED or laser or both light device can triggered not only from front of the microwave-sensor but also can triggered from outside wall people (p31) (p32) (p33).

From FIG. 16 same and alternative the said LED or laser or both light device is put indoor on corner location which offer more wider detect-areas at outdoor which can detect people (p34) (p35) to trigger the light device (16a) (16b) (16c)

From FIG. 17 shown the garden or patio or backyard areas has install the LED or laser or both light device (17b) which can trigger inside the garden, patio, landscape, backyard areas and those light (17b) also can trigger by people (p36) (p37) walk within the detect-area(s) which is outside the garden, patio, landscape, backyard (17d) (17e).

From FIGS. 18, 19, 20, 21, 22, 23, 24, 25, 26 with details description for

Figure 18:
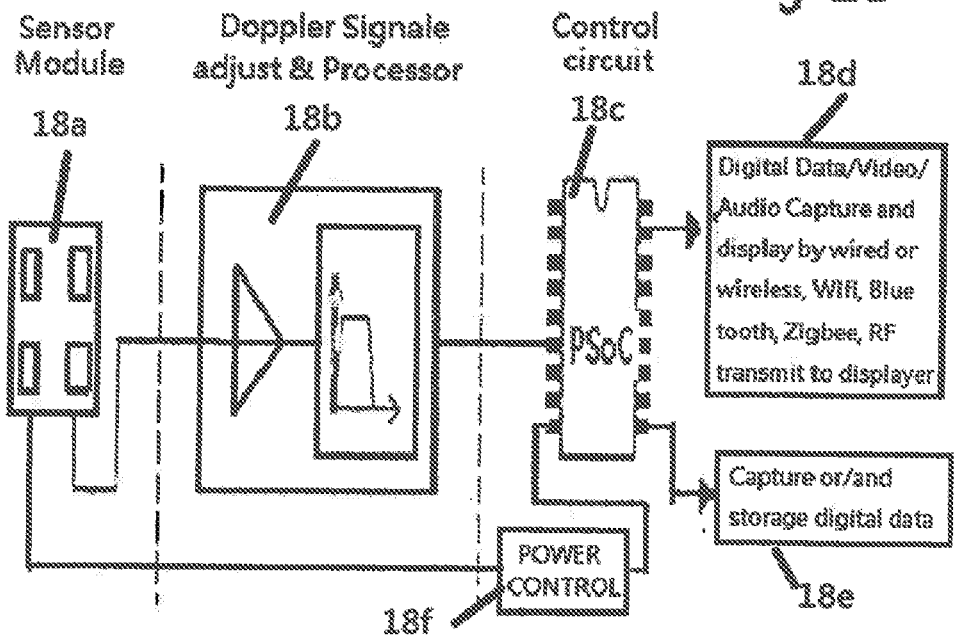

FIG. 18 shown working flow charter apply for Doppler theory, and

Figure 19:
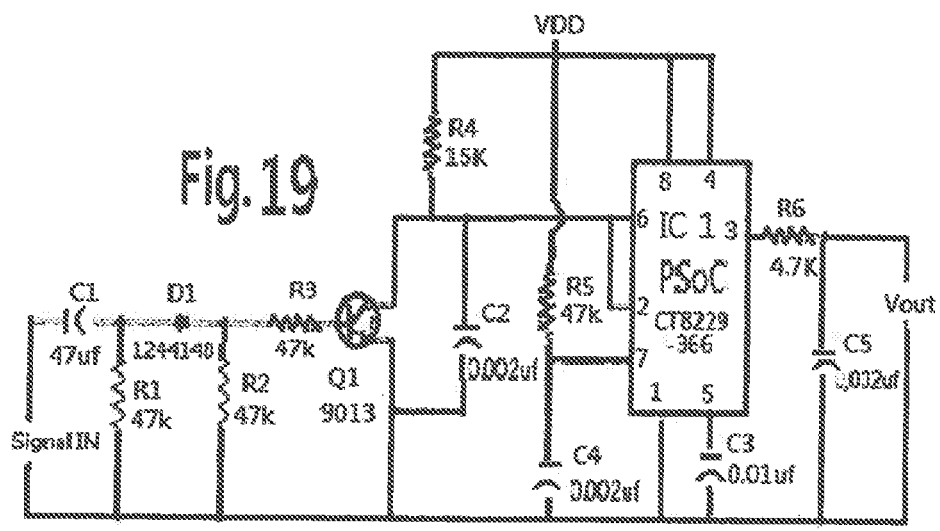
Figure 26:
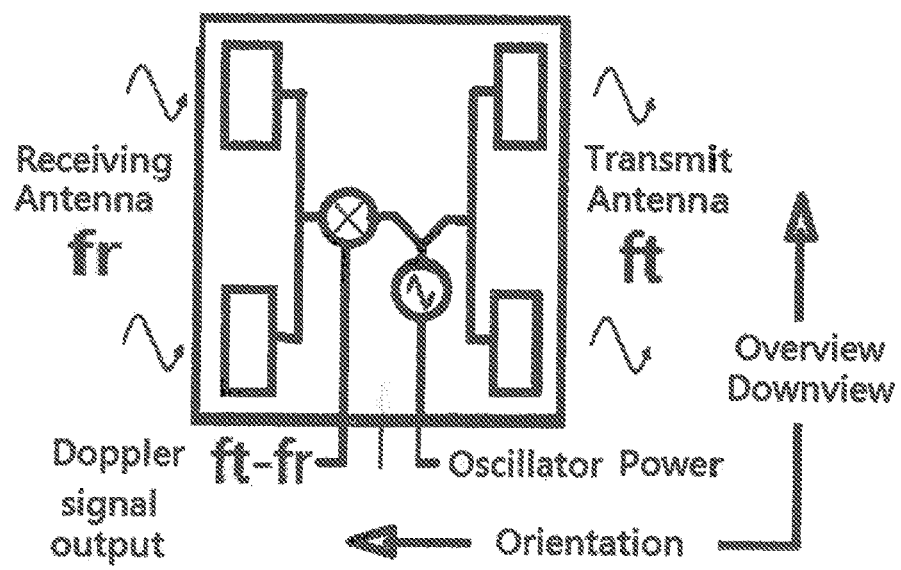

FIG. 19 shown one of preferred circuit for microwave-sensor,

FIGS. 20 and 21 show the One of preferred microwave sensor diagram with parts list, FIG. 22 show the one of preferred for DC current connection application, FIG. 23 shown the one of preferred embodiment connection for AC application, FIG. 24 shown one of preferred module for microwave sensor for detect-area, FIG. 25 show other preferred circuit diagram for microwave-sensor, FIG. 26 shown the Antenna diagram for the one of preferred design, It is appreciated any alternative, replaceable, equal functions of above discuss for market available microwave sensor circuit, diagram, flow-charter as long as offer the x-y axis for approximately 360 degree detect-area or-and Z-axis for height detect-areas should still fall within the current invention scope, idea, concept, construction and should still belong and fall within the current claim scope and range.

From FIG. 27 shown one of LED (27a) or Laser (27b) or both (27a and 27b) Light device which is powered by the prong (27h) to insert into or Plug-in wall out to get the AC Power source and the light (27) has one dome (27f) or other construction (27f) to allow the light emit direction (27e) can be change by tile the Light cover (27c) to right or left or up or down. The light cover (27c) has plurality of shape holes or opening to make the light-beam emit out with designs. The said dome or other construction on back of light has window (not punch through) with optics-lens textures or marking (not shown) to let the light-beam can make the wall for top and down illumination, or right or left illumination while the prong (27h) is rotatable construction.

From FIGS. 28,29, 30, 31, 32, 33, 34, 35 shown some preferred embodiment for battery powered security light. From FIG. 28 show the Battery operated security light has main-housing (28a) which has 4 D batteries inside to supply sufficient power to the at least two of Light-unit (28b) which has respectively adjustable or-and foldable arms (28c) (28f) which can adjust angle on vertical and horizon from 100 to 360 degree and some upgrade model also can fold the light-unit (28b) and into a cube or rectangular-unit to save the delivery cost because the size and dimension for foldable construction can save packing measurement to save delivery freight or storage-space needed.

From FIG. 29 show the similar with FIG. 28 difference at the Light-unit (29b) from rectangular to the round or oval shape of the Light-unit (29b) and has different ventilation hole which is grill like or slot like ventilation holes (29f) which can evacuate the heat but also can prevent water get into.

From FIG. 30 show the three Light-units (30d) (30f) (30j) and has main-housing (30a) which has desired number of batteries(not shown) and built-in microwave-sensor inside and the said LED or Laser or both light source ((30c) (30g) (30i) can be plurality of LED dice, chip, dip, COB LEDs or laser light source. The said light-unit has gaps (30h) (30b) (30e) to install water-proof silicone or rubber or O-ring and assembled with the front clear or opaque or milky lens to get weather environment or meet lab. Wet or outdoor testament requirement.

From FIG. 31 show the alternative design for the battery powered or AC-powered security light which has main housing (31a) where install desired number of light-unit (31b) which has a 180-360 degree rotatable Y or U base and one of round or ½ ball light-housing are fixed on the Y or U frame which allow the round or ½ ball light-housing can be rotatable on vertical from 180-360 degree so the two light-unit can has horizon and vertical rotatable angle has min. 180-360 degree to rotate and emit light-beam to any direction in x-y-z axis.

From FIG. 32 shown the AC-wire or Solar power or Built-in AC-to-DC or Outside AC-to-DC transformer or battery powered LED security light (32) which has the main-housing (32a) and the top has horizon or vertical rotating-angle each has 360 degree rotating so can emit light-beam or project lighted-patterns or lighted-image to any location or orientations. This is similar with the FIG. 31.

From FIG. 33 is similar with FIG. 32 which different at the top light-unit (33b) (33b') which has the different adjustable-arms (33c) (33f) and arms-base (33d). Rest of parts is similar or alternative for FIG. 31 and FIG. 32.

From FIG. 34 is similar with FIGS. 31, 32, 33 with alternative light-unit (34d) (34f) rest parts is similar with FIG. 33.

From FIG. 35 is similar with the FIG. 31, 32, 33, 34 with alternative light-unit (34a) (35g) rest parts is similar FIG. 35.

Figure 36:
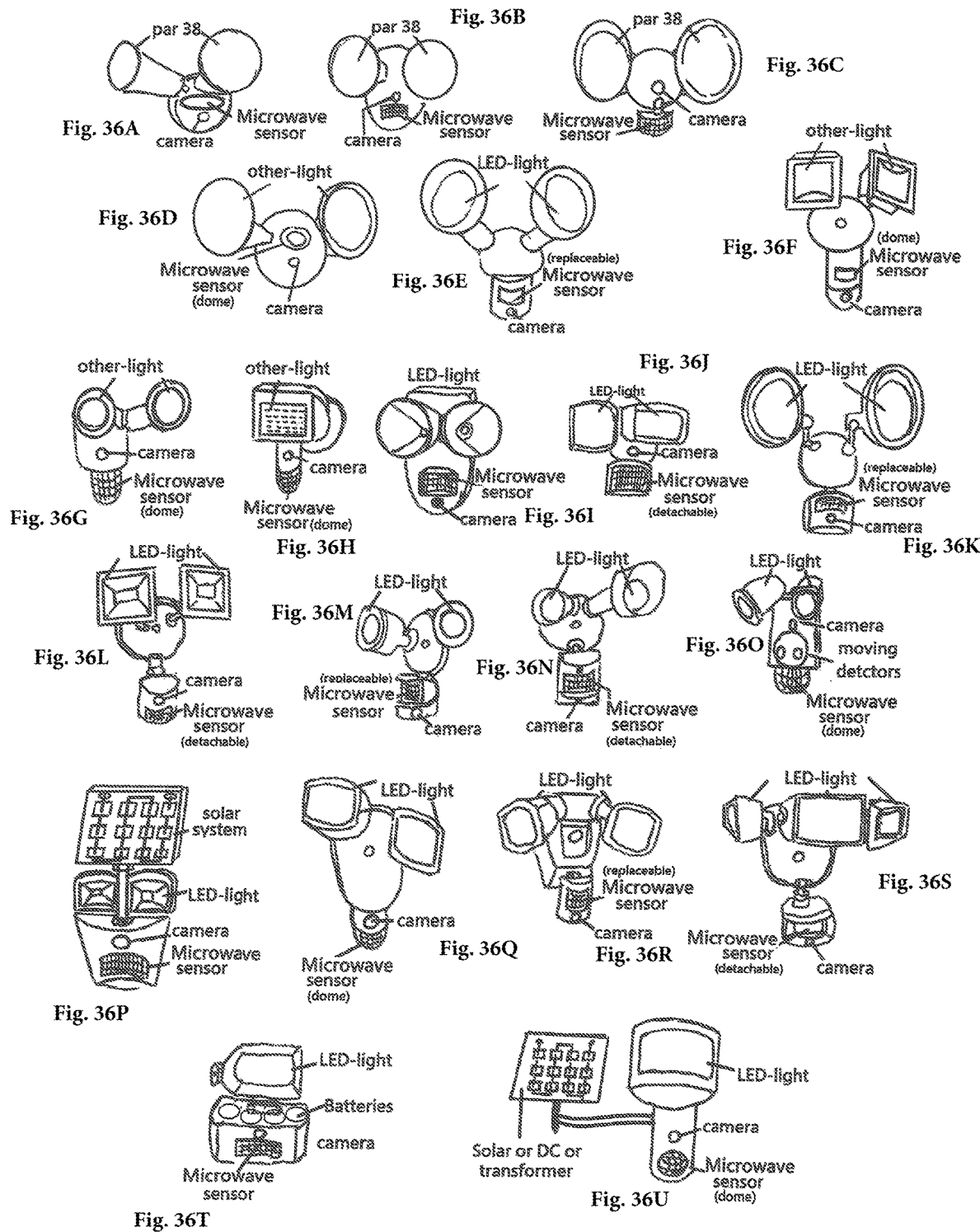

From FIG. 36 with FIGS. 36-1 to 36-18 for preferred AC-wired (36-1) (36-2) (36-3) (36-2a) (36-3a) (36-7) (36-8) (36-9) (36-10) (36-11) (36-12) (36-13), or AC-plug wire, or Solar powered (36-13) (36-18), or built-in AC-to-DC circuit or outside separated AC-to-DC transformer powered (36-14) (36-15) (36-16), or battery powered (36-4) (36-5) (36-6) (36-17) outdoor security light device; Each outdoor security light device has built-in microwave-sensor has desired X-Y axis for horizon detect-area or-and Z-axis vertical detect-area which has the same detect-area as FIG. 4 and FIG. 5 has detect-area approximately 360 degree and has X-Y axis and Z-axis detect-areas and has penetrate all kind of wall, floors, fence except the metal material so can detect not only desired indoor or outdoor areas but also can detect the outdoor and indoor areas as above FIGS. 9, 10, 11, 12, 13, 14, 15, 16, 17 discuss above.

From FIG. 37 with 37a to 37g drawing show the all kind of light-string for garden, seasonal, holiday, patio, landscape, fence, tree, wall, building, residence application which has different functions including but not limited such as (i) more than one functions, (ii) color changing functions, (iii) setting, adjustable, select functions, (iv) more than one light source, (v) detachable or replaceable or injection light-unit(s), (vi) LED or laser or both light source, (vii) LED torch or flood light with laser project light functions, (viii) has one or more optics-lens to project lighted patterns or lighted images by LEDs or-and laser, (ix)

From FIG. 37, the light string has conductive-wires (3p) in desired diameter and number of inside cooper-wires to allow sufficient current to delivery without over-heat issues. The said light-unit(s) (300) (301) (302) (303) (304) assembled with the conductive-wires (3p) or light-string (3p) in-parallel or in-series depend on market requirement and the light-unit(s) working-working voltage and input-voltage.

The said Light-unit (300) (301) (302) (303) (304) and conductive-wire (3p) or light-string (3p) is assembled or injected together with light-unit(s) base and the base assembled with the top or front light-source and other electric-parts & accessories to form a completely light-unit (s). The said light-unit (300) (301) (302) (303) (304) can be any kind of assortments of LED or laser or both with desired combination with (1) other light source: As light-unit (300) has center LED illumination which having LED in desired dice, chip, dip or COB (Chip on Board) for illumination (3a) and side ring-cover had desired grating-piece (3b) in front of inner Laser light-source (not shown) so the light-unit (300) has center for LED torch or floor or accent light illumination to lighted up the house or garden or landscape by LED and laser two light source light-string.

(2) Added or built-in project-assembly: As FIG. 37 light-unit (301) which has the inject base which has LED light-source (3c) selected from chip, dice, dip or COB (3c) and had added-on or built-in project-assembly (3d) which is a tubular or other preferred multiple piece tray, holder, disc which has wall surrounding to prevent from light-beam leakage out from join-piece while use more than one of tube, tray, holder, disc to hold the image-forming piece (3e) and front project refractive-lens (3g) to make the LED project light. This embodiment is use the light-string built-in LED light-source.

(3) Added or built-in project assembly: As FIG. 37 light-unit (302) which has dice or chip or COB LEDs (3h) as light source and assembled with added-on or built-in project-assembly kits (3h') which has one or more than one rotatable tray, holder, disc to hold the plurality of image-forming piece (3i) or optics-lens which is for refractive-lens (3m) of the rotatable disc (3k) and light-beam or lighted-patterns or lighted-image out from front opening (3n).

(4) Added or built-in project-assembly: As FIG. 37 light-unit (303) is laser light-source (3q) which the said added-on or built-in project-assembly which is part of housing or multiple piece of tray, holder, disc to hold the image-forming piece (3s) or more than one of grating-piece (3t) (3u) to form the desired laser light effects.

(5) Geometric-shape of light-unit (304) as FIG. 37 shown the geometric shape LED accent light (3w) has front optics-lens (3x) which is one of (i) diamond-cut dome lens, or (ii) spiral-groove done lens, or (iii) prism-surface dome lens, or (iv) optics-lens (3x) has inner reflective and outside has refractive convex lens; to make the inner one or more piece of LED(s) (3w) with one or more than one colors incorporated with desired IC or circuit to make group of LEDs to make color changing, LED chasing, fade-in and fade-out, denigrating effects, sequential flashing, or pair-flashing or automatically 6-30 color changing effects to form splendid light performance which available from market place or other alternative or replaceable or equal functions.

From FIG. 37 can see the light-unit (304) the front ring-cover has $2^{nd}$ light-source which can be laser or $2^{nd}$ group of LEDs with desired grating light effects to created plurality of laser image in dot-matrix, or array, or shaped matrix, or contour-shape matrix for desired color. While the laser light-source has more than one of front grating-piece in different levels will crated more splendid laser effects. It also can have rotating or moveable motor with gear-set or clock-movement to help to make changeable laser-patterns or laser-image which can make the laser light-source, or grating-film, or different level grating-film to rotating to make more exciting laser image or patterns.

From FIG. 37 light-unit (310) which has other combination for 2 groups light-source one is LED or laser or both (31b) and $2^{nd}$ groups is install on ring-cover (31a) for LED or laser or both with desired optics-lens or optics-piece for desired layers to make desired light effects.

From FIG. 37a show other alternative light-unit (200) which has conductive wire (2j) connect with circuit (2a) to dreie the $1^{st}$ light-source (2f) inside the Tube (2g) or multiple-piece of tray (2e), holder, disc (2g) so can install the light source (2e) and image-forming piece (2h) and refractive-lens (2i) to create the illumination or project-image (2j"). The $2^{nd}$ light-source (2d) is on the ring of the front surface which offer the $2^{nd}$ light-effects.

From FIG. 37b show the AC-Plug or transformer powered LED project light (2t) for outdoor use which has inner LED (2n) in dice or chip or dip or COB fit within the one or more than one piece of tube, tray, holder, disc which has surrounding-wall so while assembled together the light-beam will not leakage out from join-locations (2p). The said LED fit into or located on one end of the tube or assembly and image-forming piece (2q) is fit within the tube or assembly and top or above the tube or assembly is refractive-lens (2r). The alternative arrangement for refractive-lens (2r) can install on top-opening of the housing (2u) so the lighted-image or lighted-pattern or light-beam will not be blocked by the higher tube or higher housing-wall to make it not wider spread out by refractive-lens (2r). From FIG. 37b also has optional $2^{nd}$ group of light-source (2u) (2t) install on edge ring (2s) of housing.

From FIG. 37c show the alternative $1^{st}$ light-unit (220) which is laser light-source (22d) install on the edge of inner space which aim to movable or rotatable ring-cover (22i) one of plurality of grating-holes (G) which has grating-piece install on inside to let inside laser light-source (22d) high-power or high-wattage laser light-beam to passing through and split or divided or cutted to plurality of lighted spots, lines, image, patterns in array or matrix or linear spread out to wider areas such as stars-on-sky or universal or galaxy effects. The center of inner space of housing (22c) has desired number, color, IC, circuit to get desired LED accent or torch or flood light or other LED light effects, performance and present $2^{nd}$ choice of the light effects for any purpose light-string. This is one of example of the combination of different light source to get desired combination light effects and can switch from light source from one to other by switch, wired or wireless controller, or wireless RF transmitter and RF receiver system as above discussed.

From FIG. 37d show the alternative or replaceable or equal function for more than one light performance from one or more light source(s). The center is LED project light (23e) to project the desired lighted-patterns (23K) and outside ring cover is LED illumination (23q) (23p). and the top housing (23c) assembled with inner housing (23d) and front housing (23n) to form one light-unit (230) for the light-string (23r) for garden, landscape, patio, housing, driveway, pathway, or back yard for daily or holiday or seasonal application with more than one light effects with same controller as FIG. 37c discussed.

From FIG. 37e show the Alternative or replaceable or same functions for Light-unit (400) (401) for the light-string for all application purpose such as landscape, patio, garden, fence, wall, house, building, tree, plant for daily or holiday/seasonal applications.

From FIG. 37e shown the main light-string (4e) has one branch conductive wire (4c) (4d) connect with the said light-unit (400) to supply power to said inner LED light-source preferred is COB type (4b) or it can be dip, chip, dice, or other type LED. Wherein the light-unit is like cookie or other preferred geometric-shape and wire-string can have arrangement as (4e)(4c)(4d) in-parallel arrangement or like the in-series arrangement like the light-unit (401) has wires (4i) and (4h) both is preferred wire-string connection arrangement for conventional invention.

From FIG. 37f shown the light-unit (410) has the dome-shape optics-lens (4p) connect with the inside motor with gear-set or clock-movement axis (dot line) and hold the dome-shape optic-lens which has the diamond-cut multiple convex-lens which has flat surface inside and outside is convex-curve lens so can make lighted-patterns with one or more than one color LEDs Inside to create splendid light-effects show to people. The ring-cover space has built-in grating holds (4n) has built-inside grating piece(s) or grating-piece in more than one level stationary or rotating to make the inner one or more laser-light source emit high-wattage laser-light beam to split or divided into plurality lower wattage laser light-beam, laser-patterns, laser-images to show desired surface including indoor and outdoor powered by AC-Plug wire, or transformer, or solar power, or battery powered.

From FIG. 37g shown the same as the FIGS. 37a, 37b, 37c, 37d, 37e, 37f. . . with alternative or replaceable or equal functions application for LED or laser or both light source(s) combination and arrangement on inner or outside ring installation.

From FIGS. 38 and 38A shown the light-string (38-1) (38-18) and light-unit (5-4A) (5-3A) (5-2A) (5-1A) all made by injection process to make the base of light-unit (5-4A) (5-3A) (5-2A) (5-1A) is assembled with light-string by injection process or injection procedures.

From FIG. 38 can see the light-unit (5-4A) has base which has conductive AC-Plug (38-27) with wire (38-26) to connect with light-unit (5-4A) inner circuit (5m) and light-source (5o) (5n) both are one type of LED for horizon or vertical direction to emit the light-beam for illumination. The said LED light source no need any opening end or window because this applications only for make the illumination without project or grating-film or separated refractive optic-lens needed.

From FIG. 38 light-unit (5-3A) has base which assembled with the light string by wire (38-19) and has conductive-piece and parts to connect with inside laser light-source (5i) and LED (5l) inside the light-passing through geometric-shape housing. The laser light-source (5i) has front grating-piece (5j) fit inside of the top flat protective-lens and allow Laser high-wattage or high-power laser-beam to go through the front grating-piece (5j) to created plurality of lower-wattage or lower-power laser-beam (5lm) or laser-patterns (5lm) or laser-image (5lm) depend on what kind of grating-piece design within.

From FIG. 38 light-unit (5-2A) base is assembled with light-string ((38-18) by injection procedures and has conductive-piece (38-11) to connect with built-in microwave-sensor (38-11') and circuit (38-12) to drive the light-source here is laser (5f) with desired color and wattage or power and laser high-power or high-wattage laser light-beam go through front one or more grating-piece (5g) in one or more layers or levels. It is appreciated the alternative application the said light-string (38-18) has female-socket (not shown) assembled together and allow the separated LED or laser or both light-unit (5-2A') male light-unit (5-2A") base to screw-in or snap-in or clip-into the female bulb-socket From FIG. 38 light-unit (5-1A) has conductive-wires (38-3) to connect with joint-piece (38-2) with the main light-string (38-1) by injection procedure, and the light-unit (5-1A) has built-in LED or laser or both light-source (5b) with more than one optics-lens including flat round prism lens (5c) and top dome shape diamond-cut reflective and refractive properties lens (5d) so the light beam emit from light-source (5a) go through the prism-lens (5c) to get plurality of light-beam or lighted-patterns or lighted-image (Shown on the right side with arrows) and the plurality of light-beam, lighted-patterns, lighted-image go through the top of diamond-cut lens to spread out the light-beam, lighted-patterns, lighted-image to wider areas. It is appreciated that the said conductive-wire (38-3) top end incorporated with the said AC-plug (38-27) it can connect with AC power-source so it can become individual indoor or outdoor garden light or indoor project light device to offer desired light-effects, performance, functions as pre-determined concept. It is appreciated this concept, idea, construction is similar with co-inventor's co-pending patent filed for (#ZZZ-4) is CIP of (#ZZZ-3) is CIP of (#ZZZ-2) is CIP of (#ZZZ-1) is CIP of (#ZZZ-2013), and the current invention also is CIP of (#QQQ-3-1) is CIP of (#QQQ-3-2) is CIP of (#FF-5) is CIP of (#QQQ-3) is CIP of (#QQQ-7/6//5/4/2/1) and CIP of (#QQQ-2012), and the current invention also is CIP of (#TT-2) is CIP of (#TT-1) is CIP of (#TT-2010).

From FIG. 38A shown the light-unit (38-32) (38-33) (38-34) assembled with main light-string by injection procedure(s) and has one of quickly-connect assembly which has built-in controller or circuit and related electric parts and accessories assembly (38-35a) install within the section of (38-35) which has connect with the microwave-sensor (38-36a) which can also within the section (38-35) or other separated section (38-36) which has conductive AC-Plug wire (38-37) to connect with AC power source or linkable with other light-string female socket to get AC power source. The AC power get into from AC-Plug wires (38-37) and go through the microwave-sensor (38-36a) and circuit/controller (38-35a) to deliver electric signal to the each of said LED or laser or both light-source to make light effects, performance. It is appreciated that the microwave-sensor (38-40a) also can install within one of the light-unit (38-40) of the light-string and that is master light-unit which detected the moving objects will deliver electric-signal to other light-unit(s) of main-light-string so can get all light-unit(s) on main light-string has the desired and pre-determined functions, performance, effects.

From FIG. 39 shown the same concept of the FIG. 38 light-unit (5-1A) which has LED or laser or both light-source fit within the main housing (39a) and has built-in round and flat shape prism-lens (Not shown or see FIG. 28 (5c) and front has partical circle-ring diamond-cut optics-lens (39d) and front half ball (39b) and one section (39c) is protect-lens without any optics-properties just allow inner install grating-piece (not shown) to allow inner laser light-source (not shown) to emit through to get splendid laser light effects as FIG. 38 light-unit (5-1A) light-effect (5e). It is appreciated any alternative or replaceable or same functions for one or more light-source(s) built-into the said garden or indoor applications with AC-plug-wire (39i) has hand-held body (39j) with AC-prong (39k) or directly plug-into outlet by built-in prong (not shown) still fall within the current invention scope by conductive-kits to get AC power for indoor or outdoor application for one or more light source with desired colors.

From FIG. 40 show the direct plug-in AC outlet night light has built-in microwave-sensor (40h) for detecting moving-objects. The night light (40) has ball-joint construction for prong (40f) so can adjust the prong and front surface (40c) change relative relation to let the night light front surface can be face front or right or left (40d) or more wider angle (40e) to make the night light light beam can emit to top, lower, right, left to overcome some wall AC-outlet is near the corner so need to adjust light-beam direction away from corner. This is one of preferred sensor night light to allow light-beam emit to any desired locations not same as conventional PIR motion sensor night light only emit to front so it is not useful for wall AC outlet located near the corner or near the place people never walk-by or walk-near or walk fall within the front PIR motion sensor narrow 120 degree detect-areas.

From FIGS. 41, 42, 43 show the similar construction of the FIG. 38 light-unit (5-1A) (5-2A) (5-3A) (5-4A) with more large drawing with more details.

From FIGS. 44 and 45 shown the battery operated anywhere light can use for indoor, outdoor, camping, RV, Car, Train, Hotel which has built-in microwave-sensor (44e) (45g) and turn on the said light-unit (44h) (45f) which is one or more of LED or Laser or both light-source and the circuit inside has connect with outside slide-switch (44g) (45d) to select function for auto or off or on basing on the pre-determined functions design. The light-unit has install on a U or Y-frame and the base of U or Y-frame can make the light-unit can rotating on 360 degree on horizon and also the U or Y-frame also offer the light-unit can rotate on 360 degree on vertical so can emit the light-beam to any where consumer wanted while the built-in microwave-sensor detected the moving-object.

From FIGS. 46 and 47 shown the other simple microwave-sensor night light for seasonal or holiday use.

From FIGS. 48 and 49 and 50 show the Multiple project light-units application with built-in microwave-sensor and has different power source including AC-plug wire (48*i*), or AC-wired (49*h*) (49*g*), or battery operated by battery or solar-module (50*g*). Each of FIGS. 48, 49, 50 has at least 2 side-light (s) (48*c*) (49*e*) (50*d*) and each light-unit install on U or Y-shape frame (48*b*) (49*b*) (50*c*) so can rotating for 360 degree and the said base of U or Y-shape frame also can rotating for 360 degree so can project light-beam or lighted-patterns or lighted-image to anywhere as wish. Furthermore, the said Light device has center illumination areas (48*f*) (48*g*) (48*a*) to offer front areas illumination.

From FIG. 51 shown the garden or landscape light-string which connect each light-unit (51*a*) (51*a*1) (51*a*2) (51*a*3) (51*a*4) by conductive-wire (51*d*) and each of light-unit has base and ground stake (51*c*) or base (not shown) to install on the ground. The said one of the light-unit has built-in microwave-sensor (not shown) to trigger all the said light-units while microwave-sensor detected moving-object(s). Each of light-unit has built-in preferred light-source selected from LED or laser or both to offer desired light effects while the light-beam passing through the inner optics-lens (not shown) or-and outside one or more than one of half or-and less than half sphere or dome or ring optics-lens (51*b*) and project the desired light-beam or lighted-patterns or lighted-image (51*e*) along the pathway, drive way, garden path, back yard trail, or landscape or garden areas which can be powered by AC-Power source by AC-plug wire or AC-to-DC circuit or outside transformer, or battery power or power bank, or energy-storage units to storage the solar-module or wind-power generator or other power generator. The said optics-piece for the inside LEDs or laser or both may select from above discussed from FIGS. 36, 37, 38.

From FIG. 52 shown the light-bar device (52) with built-in microwave-sensor (52*b*) and the light-bar (52) has desired LEDs to emit out sufficient or desired brightness, color, changing color for under-cabinet, working place, closet, kitchen, laundry areas use.

From FIG. 53 shown the punk light set has separated light-unit (53A) (53B)(53C) and each of light-unit has different built-in electric parts and accessories. The light-unit (53A) has built-in microwave-sensor (53*a*) and RF transmitter (53*c*) while microwave-sensor (53*a*) detected moving object(s) will turn on the said built-in light-source (53*b*) for desired light effects and also will transmit the RF signal to other punk light-unit (53B) (53C) which has built-in RF receiver so can also turn-on the said other punk-light(s) of the group at the same time. The RF transmitter (53*c*) may has desired distance such as 100 or 150 or 200 feet and let light-unit or other electric-device(s) to receive the RF signal and operate the pre-determined light-functions, alarm, offer illumination, send out RF-signal to other group which within the 100 or 150 or 200 feet distance to other group products has built-in RF receiver. It is appreciated the said the punk-light group or set also can use RF remote controller (53*d*) to make more adjustment or setting or dimmer function including but not limited for color selection, or functions selection, duration time, brightness adjustable, setting colors, setting time period, or other desired functions from pre-programed or pre-design remote controller (53*d*) or download APP software of the phone equipment as shown on FIG. 53 remote controller (53*d*) face functions.

From FIG. 54 shown apply the microwave-sensor unit (54-1) to link with other applications light device including but not limited including entrance door light (54-2), or wall mounted light (54-3), or stair mounted light (54-4), garden solar light (54-5), solar powered light (54-5) for desk, fence, pole installation; Those get the microwave-sensor unit (54-1) RF signals while the sensor-unit (54-1) detected moving-objects and built-in RF transmitter (54*d*) send out RF signal to other device (54-2) (54-3) (54-4) (54-5) which located on 100 or 150 or 200 feet away for different functions and application and operation as above discussed for different application and installation locations. The said other device (54-2) (54-3) (54-4) (54-5) received the RF signal by built-in RF receiver (54*e*) and turn on the said built-in light-source (54*c*) for variety choice from LED or laser or both as above discussed with preferred combination of all kind of optics-lens as FIGS. 37 and 38 types. The RF transmitter (54*d*) and RF receiver (54*e*) are controlled by a control circuit (54*a*).

From FIG. 55 shown the other application for microwave-sensor unit (55A) detect the moving objects will send out RF signal by built-in RF transmitter (T1) to other function device or light-unit (55*a*) (55*b*) (55*c*) (55*d*) (55*e*) (55*f*) (55*g*) each one had built-in RF receiver (R1) (R2) (R3) (R4) (R5) (R6) or had $2^{nd}$ RF transmitter (T2) and microwave-sensor (MS3) on the device (55*f*). The other device or light-unit (55*f*) got the $1^{st}$ RF transmitter RF-signal or detected the other moving-object will transfer out RF-signal to other group which fall within the $2^{nd}$ RF transmit valid distance such as 100 feet, so this is means RF signal received from device (55*f*) and transmit the device (55*f*) own RF signal to device (55*f*) valid distance range 100 feet for $2^{nd}$ group of other device or other light-unit. The $1^{st}$ RF transmitter (T1) may has RF transmit distance is 200 feet to all other device (55*f*) and all these other device which all located less than 90 feet, only device (55*f*) is located on 190 feet so can received RF-transmitter (T1) signal and send out own RF-signal but it only 50 feet so none of (55*a*) (55*b*) (55*c*)(55*d*) (55*e*) all is near-by microwave-sensor less than.

From FIG. 55 shown the microwave-sensor unit (55A) has built-in battery (55A') or solar-module (So1) (So2) with energy storage-unit (55*s*1) or AC-wired (55A") to power the microwave-sensor (5A). The microwave-unit (55A) has built-in microwave-sensor (MS1) which can detect approximately 360 degree in x-y axis and also the height of Z-axis so hang on the top of garage door can have sufficient distance around 30 feet (9 meter) to detect the front area of the drive-way. The said microwave-sensor unit (55A) has one arm and top have ball connector (B2) to insert or join with ball-holder (H2) to make the microwave-sensor unit (55A) can adjust the direction or angle for detection. The said microwave-sensor unit (55A) also has built-in preferred 200 feet RF transmitter so can transmit the RF signal to all other device has built-in RF receiver within 200 feet including light-unit (55*a*) has distance 90 feet, and light-unit (55*b*) has 50 feet distance, and light-unit (55*c*) 80 feet away, and light-unit (55*d*) has 85 feet distance, and light-unit (55*e*) has 70 feet away, and light-unit (55*f*) has distance 190 feet, but not able to transmit RF signal to other-device (55*g*) because distance is 250 feet which is beyond the RF transmit distance 200 feet. So, The other-device (55*g*) have to get the RF signal from mid-way RF transmitter (T2) which is distance from (T2) to (55*g*) only 90 feet which is within the (T2) RF transmitter 100 feet transmitting distance range. The said Mid-way transmitter (T2) is located within the RF transmitter (T1) valid transmitting distance 200 feet because light-unit (55*f*) is located on 190 feet which is fall within the RF transmitter (T1) delivery range. After the light-unit (55*f*) got the RF transmitter (T1) RF signal and will trigger built-in RF transmitter (T2) to send out RF signal to other devices or light-kits within the 100 feet valid transmitting range, so the other-device (55*g*) can receive the RF signal because located within 90 feet of the RF-transmitter built-inside of light-unit (55*f*). So this means from $1^{st}$ microwave-sensor unit (55A)

can delivery to mid-way 2$^{nd}$ RF transmitter (T2) and mid-way 2$^{nd}$ RF transmitter (T2) an deliver RF signal to 2$^{nd}$ group other-device or light-units within 100 feet range of (T2). This is one example for linkable by microwave-sensor unit (55A) RF transmitter (T1) (T2) and RF receiver (R1) (R2) (R3) (R4) (R5) (R6) can link the other device (55g) for 2$^{nd}$ group other-device or LED-lights.

From FIG. 56 shown the ceiling light application which has built-in microwave-sensor (56-2) inside the housing and plurality of LED or Laser or both light-source with preferred milky lens or transparent-lens or other optics-lens or optics-assembly to make desired ceiling light illumination or projection or both or other combination such as FIG. 37 or FIG. 38 discussed for all kind of illumination or emit out light-beam, lighted-pattern, lighted-image or any combinations.

It is appreciated that all above discussed the night light, light bar, ceiling light, project light, garden light, security light, patio light, all kind of light-string, landscape light, floor light, torch light or other light device has built-in microwave-sensor or incorporated with photo-sensor, or-and RF transmitter, or RF-receiver, LED light source, laser light source, or both LED and Laser light source, with preferred optics-lens with reflective or-and refractive or-and diffusion or-and grating or-and hologram or optics-elements to make desired light-beam, lighted-pattern, lighted-image or other desired light effects, performance, functions.

It is appreciated as above discussed any equivalent, replaceable, same function, concept, designs to apply the microwave-sensor unit for LED or laser or both light source connect with AC power source, DC power source, Solar Power source to operate the said light-units for desired functions should still fall within the current invention concept, idea, design and fall within the current invention claims scope and cover range.

The invention claimed is:

1. An LED, laser, or LED and laser light device having a built-in microwave sensor, comprising:
   at least one LED, laser, or LED and laser light device configured to perform illumination when a microwave sensor unit built-in the light device is triggered by a moving person, the at least one LED, laser, or LED and laser light device having at least one light source,
   wherein the at least one light source includes at least one of:
   (1) a chip, dice, dual-inline-package (DIP), or chip-on-board (COB), and
   (2) a laser light source,
   the at least one light source having a predetermined color and connected in parallel or in series with a control circuit;
   wherein the light device is fitted or installed, with or without a wall or ground bracket, in or on at least one of:
   (i) a front or backyard,
   (ii) a garden,
   (iii) a garage,
   (iv) a pathway,
   (v) a wall or fence,
   (vi) at least one hidden outside location,
   to trigger at least one of:
   (a) the LED, laser light source, or LED and laser light source,
   (b) an integrated circuit,
   (c) a circuit,
   (d) a wireless transmitting system,
   (e) Wi-Fi incorporating a downloaded APP,
   (f) Bluetooth,
   (g) Z-way,
   (h) Zig-Bee,
   (i) a 3G/4G/5G/6G network or the Internet,
   (j) an IR or RF remote control, and
   (k) a wireless system;
   wherein:
   a microwave sensor of the microwave sensor unit is unaffected by temperature, dust, humidity, or ultraviolet light,
   a microwave sensor detection area extends approximately 360 degrees around the microwave unit in a horizontal plane, and also extends vertically,
   the microwave sensor is arranged to penetrate wood, mud, glass, cement, pottery, brick, clay, a wall, a divider, and non-metallic building materials,
   the light device and a control circuit powered by at least one of:
   (i) an AC power source connected by an AC wire;
   (ii) AC power supplied by prongs plugged into an AC outlet;
   (iii) DC from at least one of a solar power system, wind generator system, and chemical power system;
   (iv) a low voltage DC system or an AC-to-DC transformer;
   (v) a battery, DC bank, or DC from a DC power source through at least one of a male plug, a USB plug, a cylindrical plug, and at least one pin connector; and
   (vi) a USB wire connected to the light device and a DC power source.

2. An LED, laser, or LED and laser light device having a built-in microwave sensor as claimed in claim 1, wherein the control circuit is incorporated with at least one of (1) an IC, (2) a conductive switch, (3) a power fail, photo, sound, or moving sensor, (4) a movement sensor, (5) a rotating device, (6) a wireless, RF, IR, or remote control system, and (7) a Bluetooth connection system, the control circuit controlling at least one of the following functions:
   (1) illumination in response to sensor-detected movement;
   (2) power fail functions while detecting a home power failure;
   (3) high-low, dimmer, or adjustable brightness functions while incorporated with an IC and conductive switch;
   (4) color changing or freezing functions while incorporated with an IC and conductive switch;
   (5) fade-in and/or fade-out light performance functions have a predetermined duration while incorporated with an IC and conductive switch;
   (6) brightness, color, or light source gradation change light effects while incorporated with an IC and conductive switch;
   (7) changing functions by a switch, remote control, pre-programming, integrated circuit, or received RF signals;
   (8) photo sensor or CDS initiated turn on in response to ambient brightness;
   (9) functions of a motor or a rotating, spinning or movement device that causes an optics lens, optical element, image forming piece, or light source to rotate, spin, or move;
   (10) receiving, by a built-in RF receiver, RF signals to operate desired light functions;
   (11) triggering, by an RF transmitter, illumination, projection, or power fail lighting in other devices; and

(12) triggering, by RF signals emitted from the microwave-sensor, setting, adjusting, or selection functions of the other devices.

3. An LED, laser, or LED and laser light device having a built-in microwave sensor as claimed in claim 1, wherein the light device has a built-in RF transmitter to deliver RF signals to at least one light having at least one of (1) an RF receiver system, and (2) an RF transmitter system for transmission to another light having a built-in RF receiver after receiving RF signals from the microwave sensor unit.

4. An LED, laser, or LED and laser light device having a built-in microwave sensor as claimed in claim 1, wherein the LED, laser, or LED and laser light device has a built-in optics lens having at least one of a reflective, refractive, diffusion, grating, or diffractive property to form desired light patterns or images on nearby and/or remove areas.

5. An LED, laser, or LED and laser light device having a built-in microwave sensor as claimed in claim 1, wherein the LED, laser, or LED and laser light device has a built-in optical element or image forming piece that is at least one of a:
  (1) film,
  (2) slide,
  (3) grating piece,
  (4) light blocking piece having at least one of an opening, cut-out, and window,
  (5) injected piece,
  (6) printing,
  (7) silkscreening,
  (8) heat-transfer piece,
  (9) colored plastic, and
  (10) stencil;
  to form an image or shape or provide a pinhole imaging function.

6. An LED, laser, or LED and laser light device having a built-in microwave sensor as claimed in claim 1, wherein the LED, laser, or LED and laser light device is controlled by at least one of a switch, wired controller, wireless controller, and downloaded APP or software; to provide a desired function, setting, adjustment, or selection.

7. An LED, laser, or LED and laser light device having a built-in microwave sensor as claimed in claim 1, wherein the LED, laser, or LED and laser light device has at least one reflective, refractive, diffusion, grating, or diffractive piece to provide projected light beams, lighted patterns, or lighted images.

8. An LED, laser, or LED and laser light device having a built-in microwave sensor as claimed in claim 1, wherein the LED, laser, or LED and laser light device is a landscape light, floodlight, accent light, security light, electric candle light, pathway light, driveway light, solar light, or torch light.

9. An LED, laser, or LED and laser light device having a built-in microwave sensor as claimed in claim 1, wherein the LED, laser, or LED and laser light device is an indoor or outdoor security light having more than one angle-adjustable structure to adjust emission of light beams to areas.

10. An LED, laser, or LED and laser light device having a built-in microwave sensor as claimed in claim 1, wherein the light device is an all-purpose light string for a garden, patio, fence, residence, backyard, or landscape, the light string having a plurality of injected or screw-in fixtures for LED, laser, or LED and laser light sources, the fixtures being electrically connected by conductive wires and the light string including said microwave sensor to trigger at least one IC, circuit, or system for at least one of:
  (i) turning on and turning off functions,
  (ii) changing functions,
  (iii) providing master function, slave functions, at least one sequential trigger function, at least one linkable trigger system function, and
  (iv) providing RF receiver functions for receiving RF signals to operate predetermined functions.

11. An LED, laser, or LED and laser light device having a built-in microwave sensor as claimed in claim 1, wherein the light device is a plug-in night light.

12. An LED, laser, or LED and laser light device having a built-in microwave sensor as claimed in claim 1, wherein the LED, laser, or LED and laser light is one of a garden/outdoor illumination light, a garden projection light, and a garden/outdoor light string.

13. An LED, laser, or LED and laser light device having a built-in microwave sensor as claimed in claim 1, wherein the light device is a ceiling light.

14. An LED, laser, or LED and laser light device having a built-in microwave sensor as claimed in claim 1, wherein the light device is at least one of plurality of light bars, puck lights, cabinet lights, and under-cabinet lights.

15. An LED, laser, or LED and laser light device having a built-in microwave sensor as claimed in claim 1, wherein the light device is one of a path light string, patio light string, or landscape light string.

16. A microwave sensor unit having a built-in RF transmitter to communicate with at least one light device, comprising:
  at least one microwave unit having at least one built-in microwave sensor to detect moving objects within an area extending 360 degrees horizontally around the microwave sensor unit and vertically within a predetermined height, and which lacks a light source inside the microwave sensor unit;
  at least one RF transmitter or circuit built-in the microwave sensor unit to send out RF signals to the at least one light device for illumination when the microwave sensor unit detects a moving object,
  wherein the microwave sensor unit is powered by at least one of (a) an AC wire or prong, (b) an AC plug wire, (c) batteries, (d) a rechargeable battery for a solar module, wind generator, or chemical power generator, (e) a DC power bank or external AC-to-DC transformer, and (f) DC input through a USB connector or male plug wire from a DC power source.

17. A microwave sensor unit having a built-in RF transmitter to communicate with at least one light device as claimed in claim 16, wherein said RF transmitter or circuit has a transmitting range of up to 250 feet.

18. A microwave sensor unit having a built-in RF transmitter to communicate with at least one light device as claimed in claim 16, wherein the light device is at least one first light device having a built-in RF receiver to receive RF signals from the microwave sensor unit and the light device has a built-in transmitter to transmit RF signals to at least one of:
  (A) a second light device or group of second light devices, and
  (B) a third light device or group of light devices,
  wherein the second light device, group of second light devices, third light device, or group of third light devices are within the RF transmitting range and each of the second or third light devices or groups of light devices has a built-in RF receiver and/or RF transmitter unit.

19. A microwave sensor unit having a built-in RF transmitter to communicate with at least one light device as claimed in claim 16, wherein the light device is at least one first light that includes at least one LED, laser, or LED and laser light source device and an RF receiver to receive electrical signals transmitted from the microwave sensor unit to operate at least one first light device spaced from the microwave sensor to provided predetermined light effects, performance, or functions.

20. A microwave sensor unit having a built-in RF transmitter to communicate with at least one light device as claimed in claim 16, wherein the light device is at least one first light device that communicates with the microwave sensor unit and at least one other light device, and wherein at least one of the first light device and the other light device is at least one of a:
(1) security light,
(2) landscape light,
(3) garden light,
(4) microwave sensor light,
(5) light with built-in RF transmitter and/or RF receiver,
(6) all-purpose light string,
(7) patio light string,
(8) ceiling light,
(9) night light,
(10) puck light,
(11) light bar,
(12) function-changeable light device,
(13) color-changing light device,
(14) path light,
(15) torch light,
(16) floor light,
(17) projection light, and
(18) multifunction light for indoor or outdoor use.

21. A microwave sensor unit having a built-in RF transmitter to communicate with at least one light device as claimed in claim 16, wherein the at least one light device is a second, third, or additional light device having a microwave sensor to detect moving objects and operate a predetermined light function.

22. A microwave sensor unit having a built-in RF transmitter to communicate with at least one light device as claimed in claim 16, wherein the microwave sensor transmits a first RF signal with a first RF transmitting range to at least a first said light device having its own RF transmitter to transmit second RF signals to a second or additional light device within an RF transmitting range that is at least double the first RF transmitting range, and each said second or additional light device includes an RF receiver to receive second RF signals from the first light device.

23. A microwave sensor unit having a built-in RF transmitter to communicate with at least one light device as claimed in claim 16, wherein the microwave sensor unit or light device includes at least one of an installation kit, installation assembly, wall mounting bracket set, surface installation-sent set, base, bracket, pole, stake, bar, stand, pedestal, and an installation or attachment set for installing or arranging the microwave sensor unit or the another electrical device or light device on a wall, surface, ground, roof, ceiling, building, or house.

24. A microwave sensor unit having a built-in RF transmitter to communicate with at least one light device as claimed in claim 16, wherein the RF transmitter transmits an RF signal that is linkable from one range to at least one additional range by transmitting the RF signal to at least one first light device within a first range, the at least one first light device transmitting a second RF signal to at least one second light device within a second range that is at least double a distance of the first range, and so forth up to an Nth light device and Nth range that is N times a distance of the first range.

25. A microwave sensor unit having a built-in RF transmitter to communicate with at least one light device as claimed in claim 16, wherein the at least one light device is an all-purpose light string with a plurality of lights and only one RF receiver to trigger the light string to operate predetermined functions, performance, and effects.

26. A microwave sensor unit having a built-in RF transmitter to communicate with at least one light device as claimed in claim 16, wherein each light device communicates with the RF transmitter by a signal from at least one of (1) the microwave sensor unit, (2) at least one first light device, (3) at least one second, third or additional light device, and (4) second, third or additional groups of light devices.

27. A microwave sensor unit having a built-in RF transmitter to communicate with at least one light device as claimed in claim 16, wherein the light device has at least one LED, laser, or LED and laser light source with or without at least one optics lens, optics elements, or grating piece to form a light having more than one function, light effect or performance, the light further having a manual or automatic switch, sensor, or controller to set, adjust, or select color, brightness, functions, and/or moving effects of the at least one LED, laser, or LED and laser light source.

28. A microwave sensor unit having a built-in RF transmitter to communicate with at least one light device as claimed in claim 16, wherein the light device has a motor, gear set, clock movement, rotating device, or spin device to cause at least one of a light source, optics lens, optics elements, and grating piece to rotate, move, wave, or shake and obtain moving or changeable light beam, lighted pattern, or lighted image functions, performance, and effects.

* * * * *